(12) United States Patent
Rawdon

(10) Patent No.: US 10,633,058 B1
(45) Date of Patent: *Apr. 28, 2020

(54) SAILING WING

(71) Applicant: Blaine Knight Rawdon, Riverside, CA (US)

(72) Inventor: Blaine Knight Rawdon, Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,396

(22) Filed: Mar. 22, 2019

Related U.S. Application Data

(63) Continuation of application No. 16/262,061, filed on Jan. 30, 2019.

(51) Int. Cl.
*B63B 15/00* (2006.01)
*B63H 9/069* (2020.01)
*B63H 9/072* (2020.01)

(52) U.S. Cl.
CPC ......... *B63B 15/0083* (2013.01); *B63H 9/069* (2020.02); *B63H 9/072* (2020.02)

(58) Field of Classification Search
CPC ........ B63B 15/0083; B63B 2015/0058; B63B 2015/0016; B63H 9/0685; B63H 2009/0692; B63H 9/0621; B63H 9/061; A63C 5/11; B60K 16/00; B60K 2016/006; B62B 15/00
USPC ... 114/39.31, 39.32, 102.13, 102.14, 102.22, 114/102.31
See application file for complete search history.

(56) References Cited

U.S. PATENT DOCUMENTS

| | | | | |
|---|---|---|---|---|
| 3,247,821 | A * | 4/1966 | Waldemar | B63B 1/22 114/102.33 |
| 4,437,426 | A * | 3/1984 | Latham | B63H 9/0607 114/102.13 |
| 4,843,987 | A * | 7/1989 | Samuels | B63H 9/0607 114/39.31 |
| 7,568,442 | B2 * | 8/2009 | Kruppa | B63B 15/0083 114/102.1 |
| 9,003,986 | B2 * | 4/2015 | Jenkins | B63B 9/02 114/39.23 |
| 9,422,043 | B2 | 8/2016 | Englebert et al. | |
| 2015/0191234 | A1 * | 7/2015 | Rogers | B63B 15/0083 114/102.17 |

OTHER PUBLICATIONS

Claes Tretow, "Design of a free-rotating wing sail for an autonomous sailboat", 2017, KTH Royal Institute of Technology School of Engineering Sciences, Degree Project in Vehicle Engineering, Second Cycle, 30 Credits Stockholm, Sweden 2017 (Year: 2017).*

(Continued)

*Primary Examiner* — Anthony D Wiest

(74) *Attorney, Agent, or Firm* — Lee & Hayes, P.C.

(57) ABSTRACT

Technologies are described herein for sailing wing for a vehicle such as a sailboat. As described herein, a sailing wing includes a main sail and a control surface. The control surface is rotatable around a hinge. When deflected, the control surface using force imparted on the control surface by the wind causes the main sail to rotate about a pivot axis, creating thrust.

18 Claims, 27 Drawing Sheets

(56) References Cited

OTHER PUBLICATIONS

Aerotrope_Sailrocket_1_Wingsail, retrieved from the internet on Oct. 16, 2019, http://aerotrope.com/what-we-do/low-carbon-vehicles/sailrocket-1-wingsail.html, Wayback Machine Internet Archive Oct. 26, 2017 (Year: 2017).*
America's Cup 2017 @Bermuda, May 29, 2017, retrieved Apr. 22, 2019 from https://www.catsailingnews.com/2017/05/americas-cup-2017-bermuda-lv-day-3.html, 6 pages.
Debreyer JCD-03 'Pelican', Nurflugel, retrieved Apr. 22, 2019 from http://www.nurflugel.com/Nurflugel/Fauvel/e_pelican.htm, 2 pages.
Elkaim, Gabriel, "An Autonomous Wing-Sailed Catamaran," Apr. 2004, Catalyst: Journal of the Amateur Yacht Research Society, No. 16, 17 pages.
"Rotor Ship", Accessed Apr. 22, 2019 from http://en.wikipedia.org/wiki/Rotor_ship, 4 pages.
Rovzar, Thrills, Spills, and Royals: All the Action from the America's Cup in Bermuda, Jun. 27, 2017. Accessed from https://www.bloomberg.com/news/photo-essays/2017-06-27/photos-from-the-2017-america-s-cup-in-bermuda, 12 pages.
"Team New Zealand Capsize at America's Cup—YouTube," Jun. 6, 2017, retrieved Apr. 22, 2019 from https://www.google.com/search?q=america%27s+cup+2017&client=safari&channel=mac_bm&source=lnms&tbm=isch&sa=X&ved=0ahUKEwi5hOHL8KndAhUGzFMKHQDYDiUQ_AUIDCgD&biw=2316&bih=1504#imgrc=gNn8lyZ_11GMYM:&spf=,1555965111694, 5 pages.
Office action for U.S. Appl. No. 16/262,061, dated May 15, 2019, Rawdon, "Sailing Wing", 8 pages.

* cited by examiner

SAILING WING

CROSS REFERENCE TO RELATED APPLICATIONS

This application is a continuation of co-pending U.S. patent application Ser. No. 16/262,061 filed Jan. 30, 2019, entitled "Sailing Wing," which is expressly incorporated herein by reference in its entirety.

BACKGROUND

There are various ways to propel a boat along the water. The two primary ways are to use motors to spin a propeller and the wind to provide force to a sail or other mechanism. In conventional uses, wind propelled vehicles often use sails to deflect the wind. Sails generate forward thrust by accelerating wind toward the rear of the vehicle. There are various forms of wind-propelled vehicles, including "kite" powered vehicles (such as kite-boards), windmill-powered vehicles and parachute-powered vehicles. Kite-powered vehicles have some drawbacks in application to larger boats including very high operator workload and the potential of "crashing" the kite into the water. Windmill-powered boats generally connect the windmill to an underwater propeller, providing a kind of hybrid system that is too far from the subject system to include. In each application of interest, the propulsive means (e.g. sail or wing) operates in conjunction with a second mechanism that constrains the lateral motion of the vehicle. Such constraining mechanisms include keels, centerboards, wheels, and ice blades. The primary purpose of a sail is to provide thrust to offset the hull's water and air drag as well as drag from the keel. The keel is needed to offset side force, a byproduct of the sail or wing in almost all sailing conditions.

FIG. 1 is used to illustrate some basic force vectors that act upon a typical sailboat. In FIG. 1, aerodynamic forces are created by the relative motion of the boat and wind. The wind speed experienced by the boat is a vector sum of the wind speed relative to the fixed surface and the boat speed relative to that surface. This is illustrated in FIG. 1. In FIG. 1, the wind velocity vector relative to the surface is labelled Vwind, the boat velocity vector relative to the surface is labelled Vboat, the sum of these two vectors is called "apparent wind" and is labelled Vapparent, the angle of the wind relative to the surface path of the boat is labelled Awind, and the angle of the apparent wind relative to the surface path of the boat is labelled Aapparent. Most sailboats have a slight offset in the angle between the hull axis and the boat path due to the needed angle of attack of the keel. This angle is labelled Aslip.

In typical use, the angle of the apparent wind falls between the boat path and the wind relative to the surface. Further, higher boat speed reduces the apparent wind angle. Conversely, greater wind speed increases the apparent wind angle. The apparent wind speed is equal to wind speed when the sum of the apparent wind angle and the wind angle is 180°. To achieve this relationship as the boat slows down, approaching zero speed, the wind angle approaches 90° from behind (a slight tailwind component). To achieve this relationship as the boat speeds up, the wind angle increases beyond 90° (an increasing tailwind component). When the sum of the apparent wind angle and the wind angle is less than 180°, the apparent wind speed is greater than the wind speed. When the sum of the apparent wind angle and the wind angle is greater than 180°, the apparent wind speed is less than the wind speed. Greater wind speed results in greater apparent wind speed and vice-versa.

FIG. 2A is provided to illustrate lift, drag, and net force on a sail caused by the apparent wind. The apparent wind acts on the sail or wing to create lift and drag. In FIG. 2A, as illustrated, a lift force can be generated by the sail. This force is perpendicular to the apparent wind angle, by definition. That is, by convention, lift is perpendicular to the freestream flow which, for sailboats, is equivalent to the apparent wind. The wing also generates a drag force. This force is by definition parallel to the apparent wind angle. Lift and drag vectors, being orthogonal, may be summed using the Pythagorean equation to find the magnitude of Net Force. Lift and drag force are proportional to the apparent wind speed squared and wing area. Wing lift may be modulated by adjusting lift coefficient. This may be controlled by adjusting wing angle of attack. Drag force adds to the Net Force but increases the angle of the net force (swings the net force vector aft) when the apparent wind angle is less than 90 degrees. The wing angle of attack shown in FIG. 2A may be reversed so that the lift vector points in the opposite direction. This is illustrated in FIG. 2B. In this case, both the lift vector and drag vector point aft, resulting in a strong braking action.

FIG. 3 is used to illustrate thrust and sideforce. The Net Force vector may be resolved into two vectors. These are Thrust, a force parallel to the path of the boat on the water surface, and Sideforce, a force perpendicular to the boat's path. Thrust drives the boat forward. In a steady-state condition, the wing's thrust equals the sum of the drag from the hull moving forward through the water and the air as well as the drag of the keel (or centerboard) dragging through the water. Increased thrust generally results in increased boat speed and vice-versa. Sideforce is a byproduct of the wing thrust process that is produced in almost all sailing conditions. Exceptions include when the boat is headed directly downwind.

As the net force angle increases (sweeps aft), the thrust magnitude diminishes and may reverse. The net force angle is increased by increased drag and by smaller apparent wind angles. At smaller apparent wind angles, wing drag strongly subtracts from thrust. At higher apparent wind angles, drag has a weaker effect on thrust. As the apparent wind angle moves aft, thrust increases and sideforce tends to diminish.

FIG. 4 illustrates keel forces. Most wind-powered vehicles have a mechanism that opposes wing sideforce with an equal and opposite force so that the vehicle may proceed along its intended path. In the case of sailboats, most have a keel or centerboard projecting below the hull. Landsailers use wheels and ice boats use blades. Keels and centerboards act as a wing in the water to generate lift to oppose the sideforce. They also generate drag. A force diagram is provided in FIG. 4.

In FIG. 4, keel lift opposes sideforce with and equal but opposite force. It also creates some drag to be overcome by the wing thrust. Keel lift is, by definition, perpendicular to the boat's path through the water. Keel drag is, by definition, parallel to the boat's path. To generate lift, the keel typically must operate at an angle of attack to the path (slip angle). Since the keel is typically fixed to the hull (and the boat is laterally symmetric), the hull must also pass through the water at the same slip angle as the keel. Note that this diagram assumes that all sideforce is provided by the keel. This may not be true—the hull may also provide some sideforce because it is slipping through the water at a slight angle.

Conventional sailboats can have some limitations. Upwind speed ("velocity made good") is inhibited by a sail's relatively high drag. When pointing upwind, sail drag is in near opposition to thrust, so thrust is diminished by drag. High drag is a product of the imperfect airfoils formed by sails, drag from the mast and rigging, and an inefficient spanwise distribution of lift. Velocity made good (VMG) is the boat's speed component in the opposite direction of the wind (directly into the wind), a key measure of sailboat performance. For a given set of conditions there is an optimum heading that maximizes VMG by providing the best combination of upwind angle and boat speed. High sail drag reduces thrust and boat speed at high upwind angles. This results in the optimum heading providing both reduced boat speed and upwind angle, hurting VMG. A favorable VMG is important because sailboats spend a considerable fraction of many round-trip journeys sailing at or close to the optimum VMG condition. Further, large heading changes require careful coordination of sail adjustments and the boat heading. Emergency maneuvers, for instance to recover a man overboard, can be difficult and time-consuming to execute safely.

Gusty wind conditions place an additional workload on the crew to rapidly adjust sail trim. Gusts in wind strength or direction can endanger the boat with excessive heeling moment, potentially resulting in capsizing the boat. Larger sailboats have many separate controls and usually require a multiple-person crew to operate. Significant effort is required on each voyage to prepare the boat to sail. Preparations include selecting sails, raising or unfurling sails and trimming. This often must be done while underway because the boat's orientation in the slip with respect to the wind may be unfavorable. Conversely, significant work is required to lower and stow sails before berthing or tying up.

Substantial sail configuration changes are often required to accommodate wide changes in wind conditions. This can take a lot of time and work. Adjustments to sail configuration and to sail trim involves high loads and significant power. Connecting and disconnecting sheets (lines to sails) may be required to change sails or even just to tack. Alternatively, sheets may need to be disconnected from one set of winches and reconnected to other winches, a laborious and demanding task. In light wind conditions when motoring, sails are usually lowered, especially when motoring upwind. Aerodynamic drag from the mast and rigging is significant, especially when motoring upwind, resulting in additional fuel consumption. Also, drag from the mast and rigging may contribute to dragging an anchor or mooring in high wind conditions.

Operation of the boat requires access to the deck to operate the sails. Most sailboats are operated from an open or partially open cockpit with ready access to most of the sail controls and to the deck for access to the sails themselves and to additional sail controls. Sailboats with interchangeable sails may require a sail storage area with access to the deck. Sail rigs are typically anchored to the hull in multiple places and impose large loads on the hull. Rig attach points may include the forestay, main stays, back stay, the boom yang, the mainsheet (or traveler), the jib sheet, and winches that control the sails. These many load points increase the weight and cost of the hull and conflict with other potential uses of the deck (such as walking and relaxing). Sometimes, cantilevered masts are used. The dimensions of such masts are a compromise between aerodynamic efficiency and structural weight. That is, they are both heavier and less efficient than masts otherwise separately optimized for aerodynamics and structure. Complexity of the sail and rigging system results in many potential points of failure. A single failure may disable the sail.

It is with respect to these and other considerations that the disclosure made herein is presented.

SUMMARY

Technologies are described herein for a propulsive wing for a surface vehicle. In some examples, the propulsive wing is used as a sail for a boat. The propulsive wing utilizes various force vectors to generate thrust, propelling the vehicle along the water. The propulsive wing includes an aft control surface running along at least a portion of a vertical axis of the sail. The propulsive wing further includes a hinge rotatably connecting the control surface to at least a portion of a sail, the hinge configured to rotate about a hinge axis.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for a propulsive wing for a surface vehicle. While the presently disclosed subject matter may be described with respect to what is termed as examples, embodiments, and the like, it is understood that the presently disclosed system is not limited to the disclosed embodiments.

Furthermore, it is understood that the presently disclosed subject matter and its various examples are not limited to the particular methodology, materials, and modifications described and as such may, of course, vary. It is also understood that the terminology used herein is for the purpose of describing particular embodiments only, and, is not intended to limit the scope of the presently disclosed subject matter. Unless defined otherwise, all technical and scientific terms used herein have the same meaning as commonly understood to one of ordinary skill in the art to which this presently disclosed subject matter and its examples belongs. Although any methods, devices or materials similar or equivalent to those described herein can be used in the practice or testing of examples of the presently disclosed subject matter, various methods, devices, and materials are now described.

Figure 1:
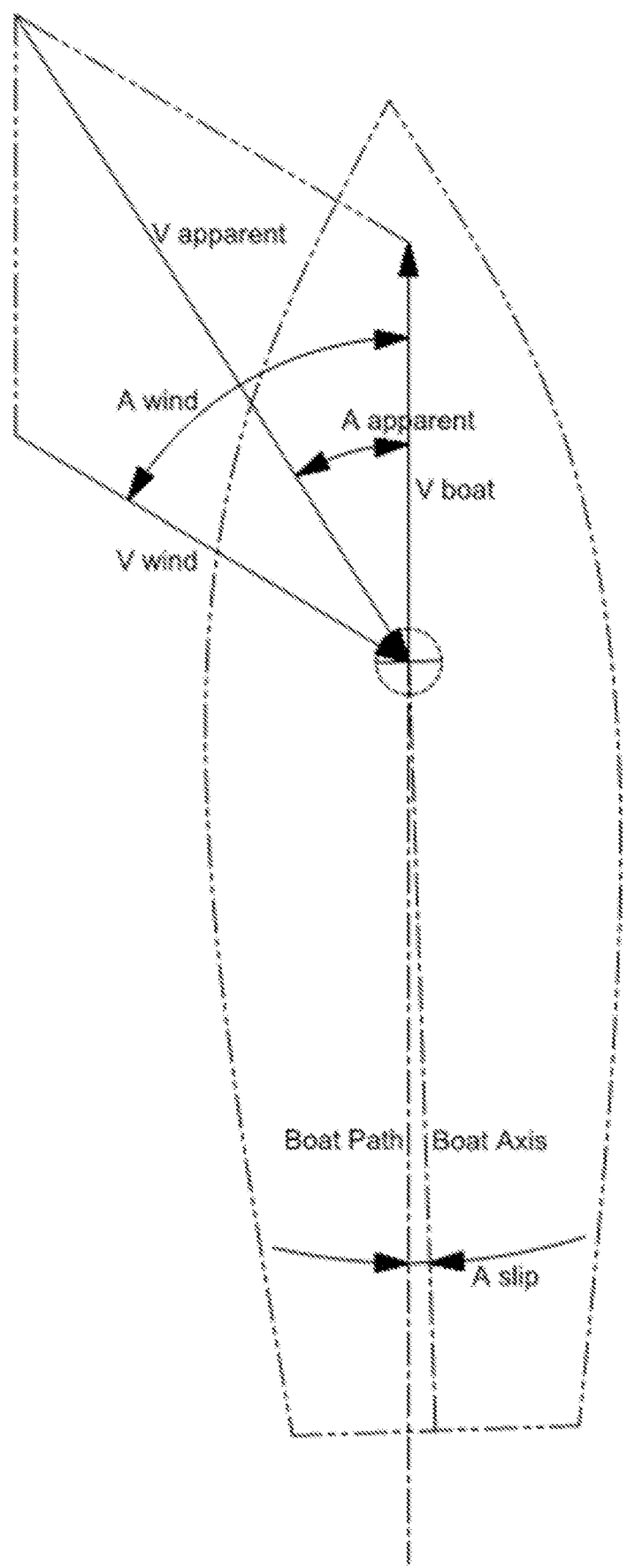
FIGS. 1, 2A, 2B, 3, and 4 are illustrations of a sailboat explaining forces imparted on the sailboat caused by the wind.
Figure 2A:
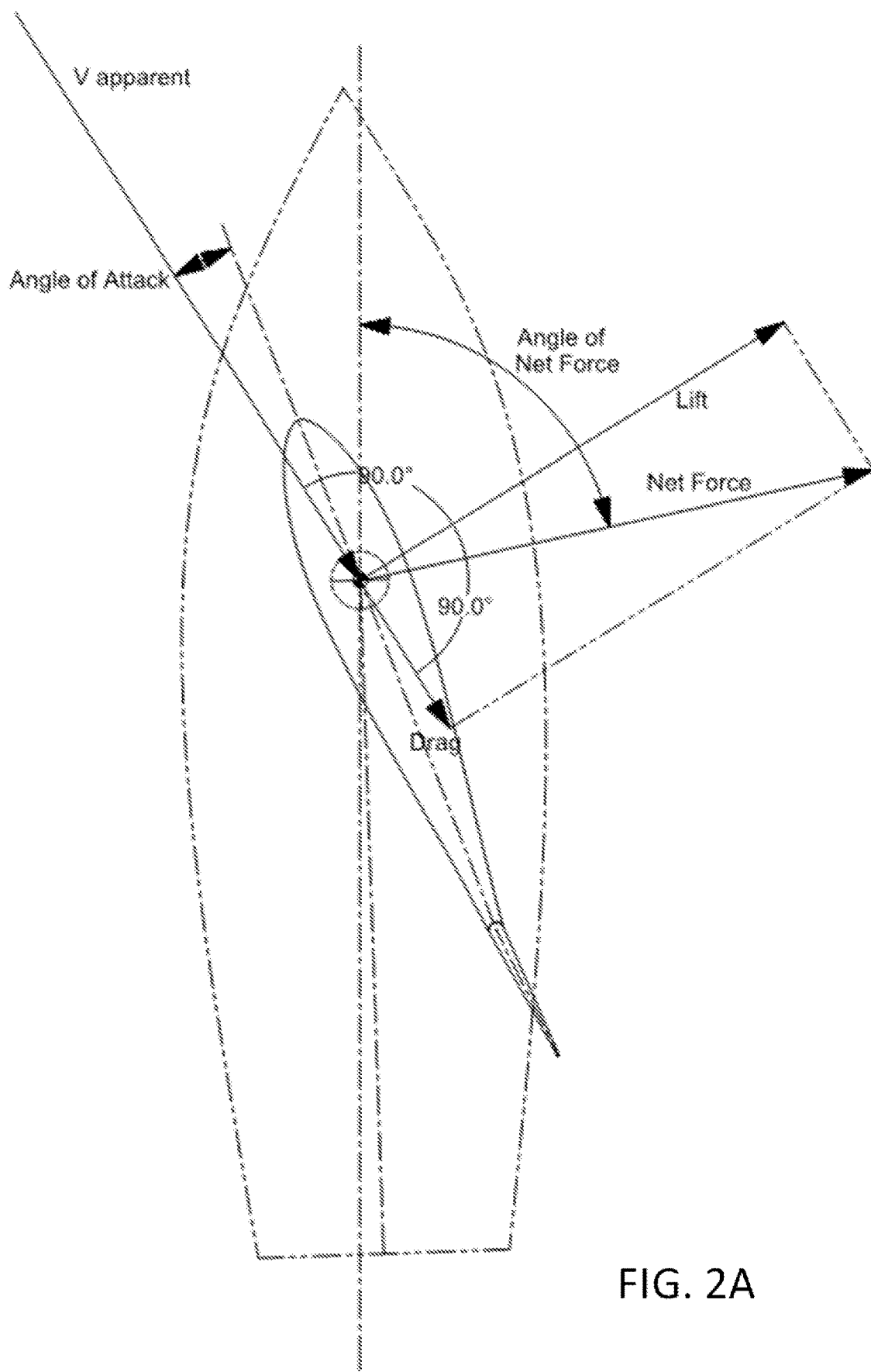
Figure 2B:
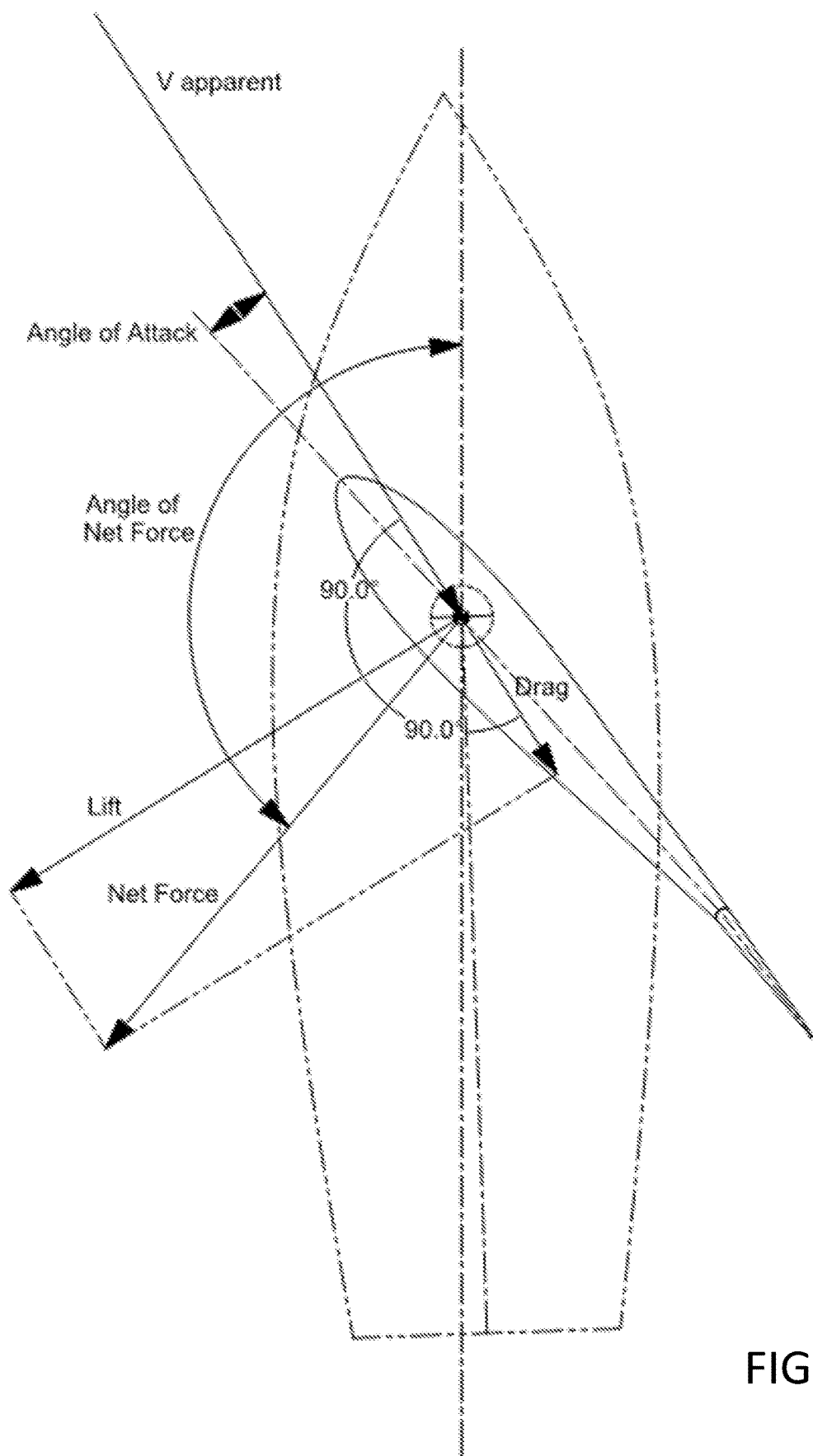
Figure 3:
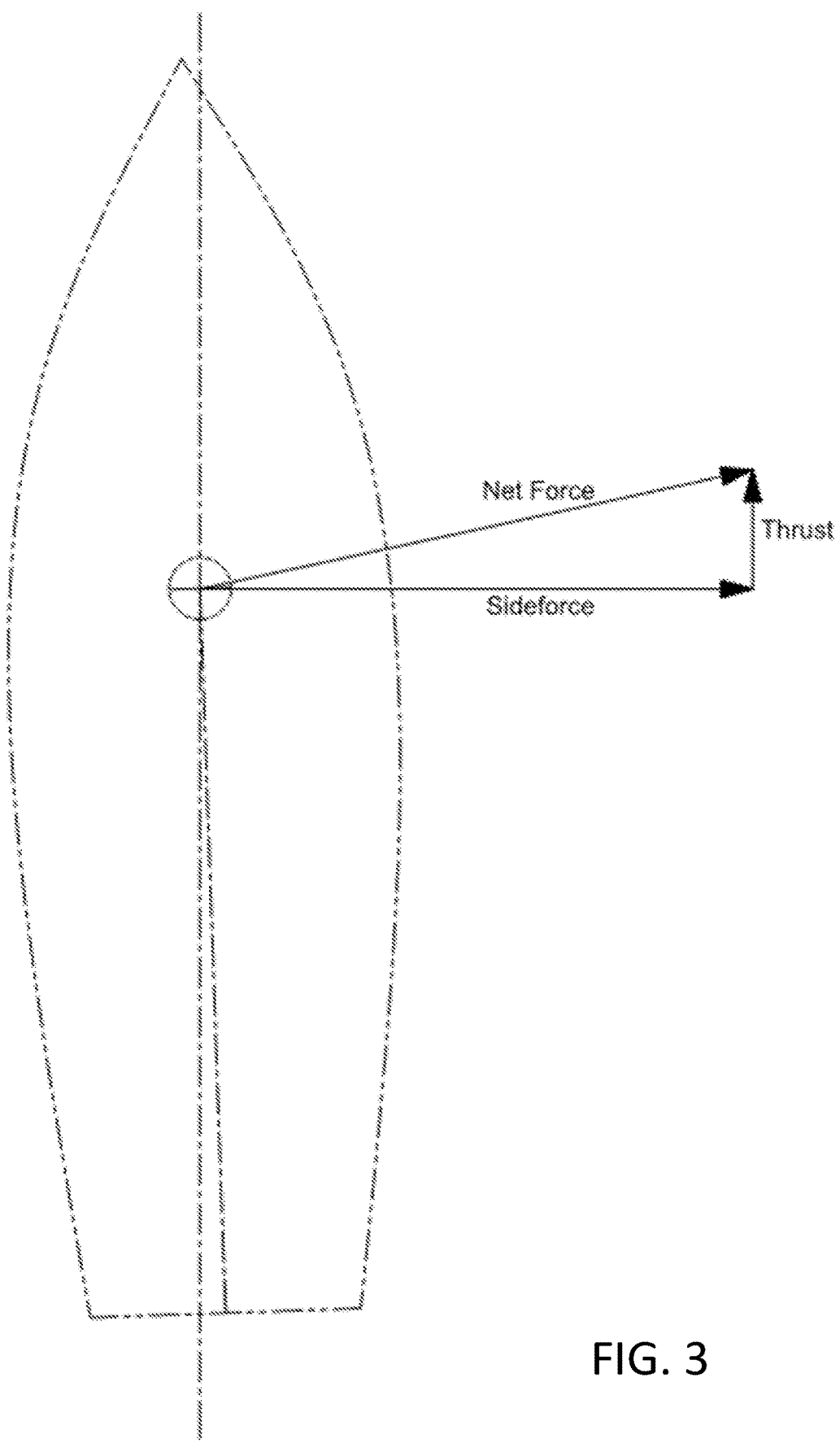
Figure 4:
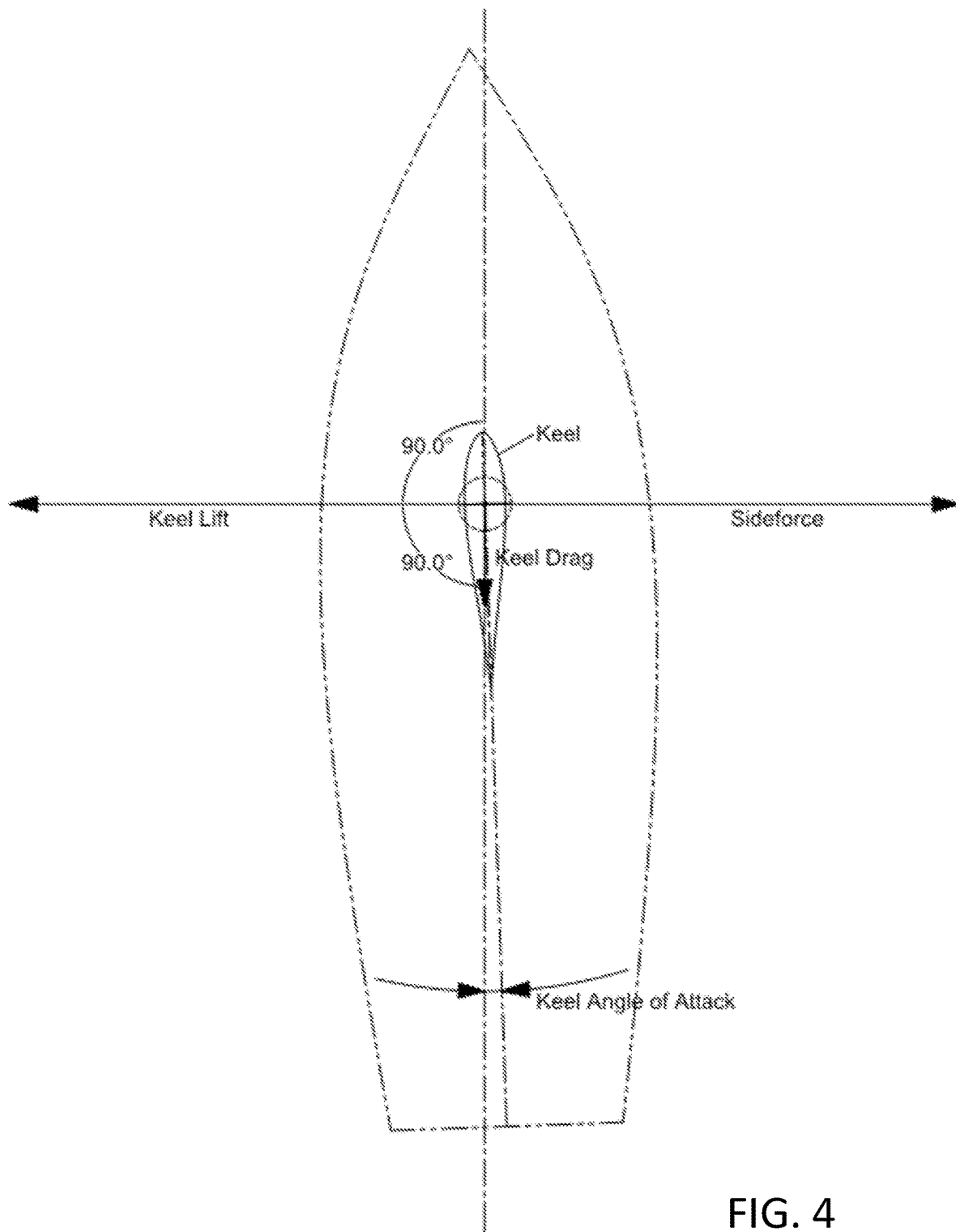
Figure 5:
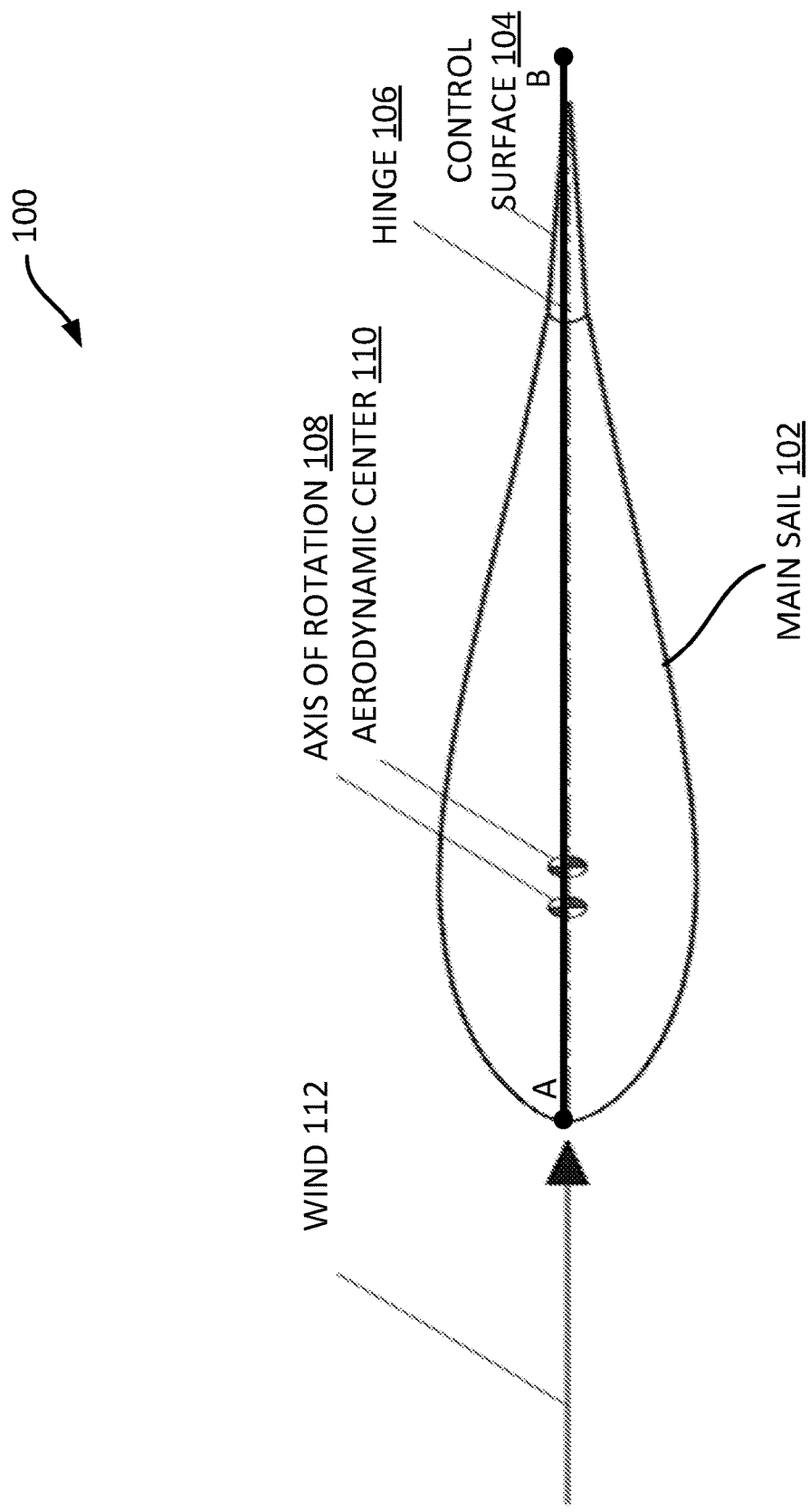
FIG. 5 is a top-down view of a propulsive, sailing wing for use in a vehicle such as a boat.

FIG. 5 is a top-down view of a propulsive, sailing wing 100 for use in a vehicle such as a boat. The sailing wing 100 includes a main sail 102. In various examples, the main sail 102 is a rigid or semi-rigid sail. As used herein, "rigid" means that under normal operational conditions, the outer surface of the main sail 102 has little to no deformation. In some examples, the main sail 102 can be constructed of a cloth or plastic tightly pulled over an inner frame (not shown) to create a rigid or semi-rigid main sail 102. The terms rigid and semi-rigid are used herein to denote a sail whose surface is designed to not deform (or deform a small amount) under most sailing conditions. This is opposed to a soft or deformable sail that is designed to deform to "capture" at least a portion of the wind, such as a spinnaker or deformable cloth sail.

The sailing wing 100 further includes a control surface 104 rotatably coupled to the main sail 102 through a hinge 106. In some examples, as described in more detail hereinafter, the sailing wing 100 may be free to rotate about an axis of rotation 108. The hinge 106 may be a rod, bearing, or other structure that allows the control surface 104 to rotate about an axis running through the hinge 106. This allows the control surface 104 to be angularly deflected with respect to main sail 102. The control surface 104 may extend along some or all of the spanwise length of the sailing wing 100. In some examples, there is one control surface 104. In other examples, there are a plurality of control surfaces 104 that may be operated together or individually, as described below. In some examples, the control surface 104 may smoothly fair into the main sail 102, as illustrated in FIG. 5, or, the control surface 104 may be supported aft of the main sail 102 with a gap, sometimes less than 5% of the local chord length.

When the control surface 104 is not deflected, i.e. the centerline of the control surface 104 is parallel to the centerline of the main sail 102 along line AB, the wing forms a laterally symmetric shape, the configuration illustrated in FIG. 5. This shape illustrated in FIG. 5, in combination with the forward location of the axis of rotation 108 in relation to the aerodynamic center 110, results in the sailing wing 100 naturally and automatically (passively in some examples) aligning with the wind 112. This results in an approximate absence of thrust and heeling moment as well as low drag when the surface is not deflected.

Despite its symmetric shape illustrated in FIG. 5, when underway (sailing) at higher speeds and/or in the presence of stronger winds with a significant wind gradient, in some examples, the sailing wing 100 may create a small heeling moment and very little thrust or braking force. This symmetric shape (zero trailing edge deflection) may be employed when the boat is moored or berthed to provide zero heeling moment and minimum drag on the boat. This is a desirable state for mooring and berthing. Drag and heeling moment in this condition may be less than that of most conventional sailboat rigs with the sails stowed. That is, the aerodynamic drag of a conventional sailboat's bare mast and rigging is likely to be greater than the drag of a faired wing. This symmetric shape (zero trailing edge deflection) may be employed when motoring. Especially when motoring in an upwind direction, the sailing wing 100, shown as faired in FIG. 5, provides less drag than a conventional sailboat's bare mast and rigging. This can increase boat speed or reduce fuel consumption.

Figure 6:
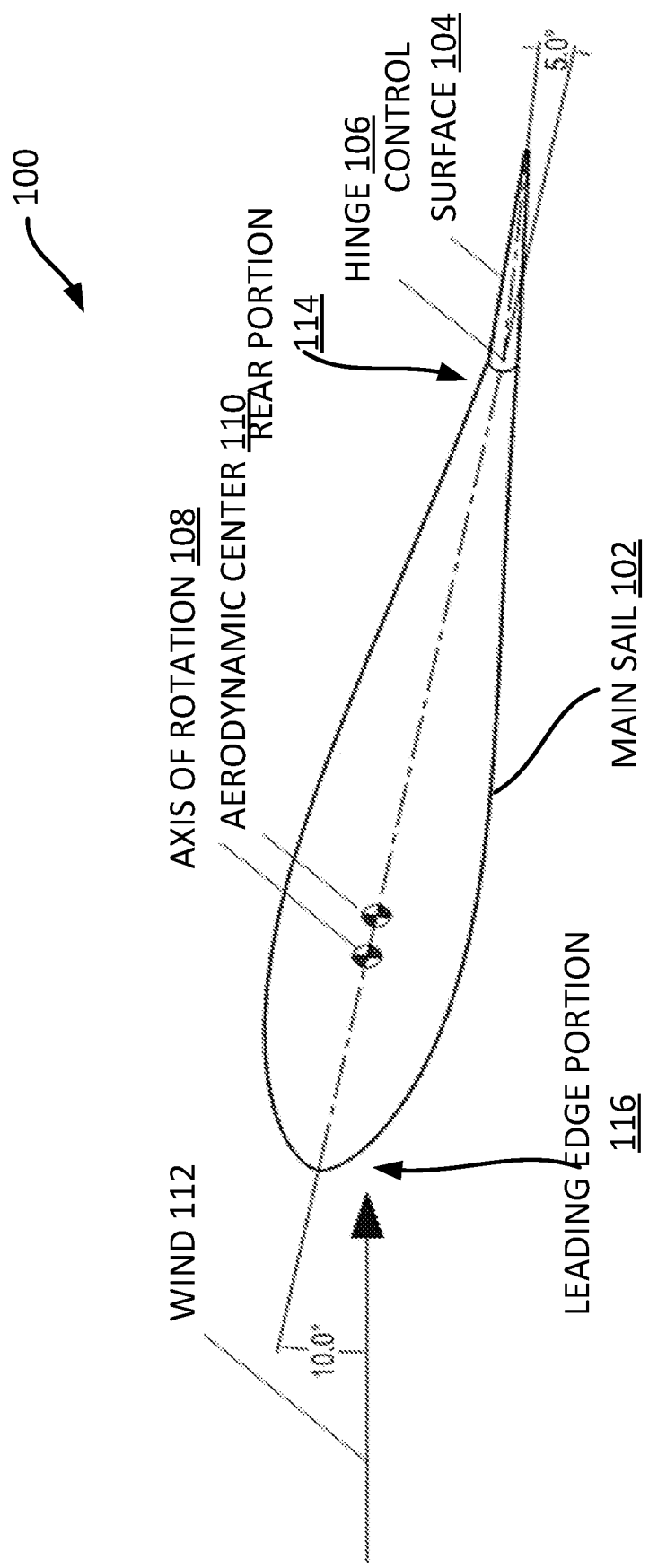
FIG. 6 illustrates the use of the sailing wing to propel a vehicle, such as a boat.

FIG. 6 illustrates the use of the sailing wing 100 to propel a vehicle, such as a boat. The angle of attack of the main sail 102 of the sailing wing 100 can be controlled by the angular deflection of the control surface 104. A relatively small deflection of the control surface 104 in the leeward direction causes the sailing wing 100 to increase its angle of attack and make lift such that the boat heels to leeward and the boat is driven forward.

When the sailing wing 100 is pivoted ahead of the aerodynamic center 110, the sailing wing 100 becomes stable and tends to trail with zero angle of attack when the control surface 104 is not deflected. To increase the angle of attack and generate lift, a force is required to pitch the wing leading-edge-up in relation to the centerline of the main sail 102. As illustrated in FIG. 6, this is accomplished by deflecting (rotating about the hinge), the control surface 104 upwards, which pushes the rear portion 114 of the main sail 102 downwards and pitching the leading-edge portion 116 upwards, resulting in an angle of attack (illustrated by 10° in FIG. 6). As used herein, "upwards" and "downwards" are used to denote spatial movement, not a particular degree of movement. As used herein, "up" or "upwards" may denote a direction generally in the direction of lift and "down" or "downwards" may denote a direction generally in an opposite direction to "up" or "upward," unless clearly identified otherwise. The resulting movement of the rear portion 114 downwards in relation to the upwards movement of the leading edge portion 116 is shown in FIG. 6.

Over much of the sailing wing's operating range, the change in angle of attack is approximately proportional to the deflection of the control surface 104. Lift force generated by the sailing wing 100 is approximately proportional to the sailing wing 100 angle of attack. These relationships are maintained even when the wind direction or boat heading is changed. The sailing wing 100 seeks to maintain the set angle of attack without input from the crew or any active (automatic) control system. Furthermore, a crew can incrementally change the deflection of the control surface 104 to adjust the wing's lift continuously from zero to maximum. This enables a crew to control the boat's speed and heeling angle, for instance.

In the case that the boat heading changes (for example during a tack or jibe) the windward and leeward sides are reversed (move from port to starboard for example). In this case the crew may rotate the control surface 104 so that it returns to the wing's leeward side (negative deflection) to provide the wing with a positive angle of attack so that it thrusts the boat forward. When tacking or jibing, a smooth transition across the sailing wing 100 may be made by zeroing the deflection of the control surface 104 during the transition. This also tends to reduce boat drag during the transition, helping to retain boat speed.

When the boat is stopped or underway it is possible to reverse the deflection of the control surface 104 to the windward side. This drives the sailing wing 100 to a negative angle of attack, creating thrust towards a boat's stern. This can be used to back up the boat or to provide positive braking for a boat when underway. This may be useful in close quarters when docking or perhaps to recover a man overboard.

Other potential advantages of the various examples of the sailing wing may be as follows. For example, the sailing wing 100 may be laterally symmetric. This feature provides equal performance on starboard and port tacks. Sailboats generally spend equal time on starboard and port tacks. For most sailboats, laterally symmetric performance is desirable. The vast majority of wind-powered vehicles are laterally symmetric for this reason.

The sailing wing 100 may use an airfoil or stack of airfoils. In comparison with a thin flat plate, an airfoil with thickness provides low drag over a much wider range of angle of attack and can make much greater lift per unit area. In comparison with a cambered thin airfoil (a "frozen sail"), an airfoil with thickness provides a much wider range of angle attack with low drag. Importantly, a symmetrical airfoil provides low drag when making zero lift (at zero angle of attack) whereas a thin cambered airfoil may make much greater drag at zero lift. Airfoils benefit performance over much of the boat's operating range.

The sailing wing 100 may be pivoted about an approximately vertical axis located slightly ahead of the sailing wing 100's aerodynamic center. This feature enables a free-turning sailing wing 100 to be self-trimming to different angles of attack without the need for a stabilizer. Benefits of self-trimming are described below.

The sailing wing 100 is "strung" on the pivot axis at approximately equal chordwise fractions from root to tip. The sailing wing 100 is not significantly swept with respect to the pivot axis. The benefit of this arrangement is that sailing wing 100 trim (trimmed angle of attack) is rendered relatively insensitive to the effects of wind gradient. Wind gradient affects both wind speed (dynamic pressure) and apparent wind direction. If, for example, one portion of the sailing wing 100 is offset behind the axis then additional dynamic pressure or apparent angle of attack on this portion will tend to reduce the overall sailing wing 100 angle of attack.

The pivot axis of the sailing wing 100 is approximately vertical. The sailing wing 100 is approximately un-swept with respect to the direction of the freestream. The axis may be swept forward (tip ahead of root) or aft up to about 15 degrees with little aerodynamic effect. Sweep may provide benefits in terms of structural integration or boat handling. For example, sweeping the sailing wing 100 aft moves the sailing wing 100 root and its axis forward. This may permit better integration with boat structure including the connection to the keel. In another example, sweeping the sailing wing 100 aft moves the center of pressure of the sailing wing 100 aft with respect to the root. Adjustments of this type may benefit the balance of the boat in terms of required rudder input with heeling.

The sailing wing 100 may be freely rotatable about the pivot axis. As used herein, "freely" means the sailing wing 100 may rotate about the pivot axis without the application of a force other than that which is received from wind forces imparted on the sailing wing 100. For example, ropes, motors, and the like may not be necessary to rotate the sailing wing 100 about the pivot axis, the rotation of which may be accomplished by the deflection angle of the control surface 104. In some examples, the sailing wing 100 can rotate a full 360 degrees, and can continue rotating past the 360 degrees, around the pivot axis.

The sailing wing 100 may be self-trimming. The sailing wing 100 can be set to self-trim to produce zero lift despite changes in wind direction, wind strength, and boat heading. This enables a boat to be anchored, moored or berthed without lowering sails (or removing the sailing wing 100). Conversely, the boat can depart an anchor, mooring or berth without raising sails. Time and workload to begin or end a sailing voyage is greatly reduced. The boat can be motored upwind without lowering sails and with reduced aerodynamic drag compared to a conventional sailboat with sails lowered and/or furled. This can enable faster motoring speeds and/or reduced fuel consumption. The boat can be brought to an approximate halt when underway by neutralizing the sailing wing 100, thereby centering control surfaces. This can facilitate a man overboard rescue, fishing, or other activities such as swimming. The sailing wing 100 can be set to self-trim to a selected non-zero incidence. The selected incidence is maintained despite changes in wind direction or boat heading. This can reduce crew workload or reduce the number of crew required to operate the boat. Selectable incidence can be restricted to a range over which the sailing wing 100 is effective. This can improve the effectiveness of the sail.

The sailing wing 100 can be set to self-trim to a negative incidence. A negative incidence can be used to back (reverse) the boat or to provide braking force when underway. This enhances maneuverability in close quarters and may facilitate man overboard rescue maneuvers.

The sailing wing 100 may be compact in chord. The sailing wing 100 may be capable of generating more lift per unit area than sails. For this reason, sailing wing 100 may have less chord than an equally powerful sail. A sailing wing 100 may be designed that extends an acceptably small distance beyond the width of the hull (or is within the hull boundary) when the sailing wing 100 rotates about its vertical axis. A benefit of this is that the boat may be berthed or tied up in proximity to other boats without the sailing wing 100 fouling with the other boats' superstructure or rigging.

This may be contrasted from the necessarily large chordwise extent of "Splice" type tail-stabilized rigs. The relatively short chord of the sailing wing 100 includes the mass balance. The wing angle of attack may be preferably isolated from effects of gravity and linear acceleration, or may in other examples, be controlled solely by the trailing edge surfaces. To this end, each independently controlled wing segment may be statically mass balanced about the pivot axis. Additionally, isolation from the effects of angular acceleration such as roll and pitch motions may also be beneficial in some examples. To this end, each independently controlled wing segment may be dynamically balanced about the sail wing pivot axis with respect to the boat's roll and pitch axes. Balance weights may be located within each segment or may be mounted on a boom in front of the wing as shown in FIGS. 13-20 (excluding FIG. 15). In some example, each segment of a multiple segment sailing wing may need individual static and dynamic balancing.

The forward extent (tip) of the mass balance may be an equal distance or less from the pivot axis than the sailing wing 100 trailing edge. This permits the mass balance to sweep a smaller arc than the sailing wing 100 trailing edge.

This facilitates the use of multiple sailing wings without their potential conflict. That is, the sailing wing can be spaced longitudinally more closely than a tailed pivoting sailing wing 100 for which the tail sweeps a large arc.

The sailing wing 100 may seal with the hull. Although the sailing wing 100 is free to rotate about its vertical axis, when underway the sailing wing 100 often operates within a small angular range with respect to the hull. This range is roughly plus or minus 30 degrees from the orientation in which the sailing wing 100 leading edge is aligned with the boat's bow.

It is within this range that achieving low drag from the sail is most important because drag largely opposes thrust. If the root (bottom) of the sailing wing 100 can be aerodynamically sealed to the hull and, in turn, the hull is sealed to the water surface, the effective span of the sailing wing 100 is approximately doubled relative to the same sailing wing 100 with a large gap between the sail and hull. This effective increase in span results in a substantial reduction in induced drag. This primarily benefits upwind velocity made good. Due to the relatively compact root chord of the sailing wing 100 it is possible to configure the junction between the sailing wing 100 and hull to provide an aerodynamic seal over this primary angular operating range. Aerodynamic sealing may be difficult to achieve with conventional sails due to the large root chord of most sail systems that extends over functional regions of the hull including the cockpit.

Sealing may be achieved by matching the boat mating surface geometry to the sailing wing 100 root surface. This can be achieved with a range of geometric shapes. For example, the boat mating surface may be a plane that is perpendicular to the sailing wing 100 pivot axis. The boat mating surface may be a cone for which the axis of the cone is coaxial with the sailing wing 100 pivot axis. The boat mating surface may be a surface of revolution for which the axis of revolution is coaxial with the sailing wing 100 pivot axis.

FIGS. 7-13 are side view illustrations of different main sail configurations that may be used in conjunction with a control surface. For the purposes of simplicity, the control surface is not illustrated.

Figure 7:
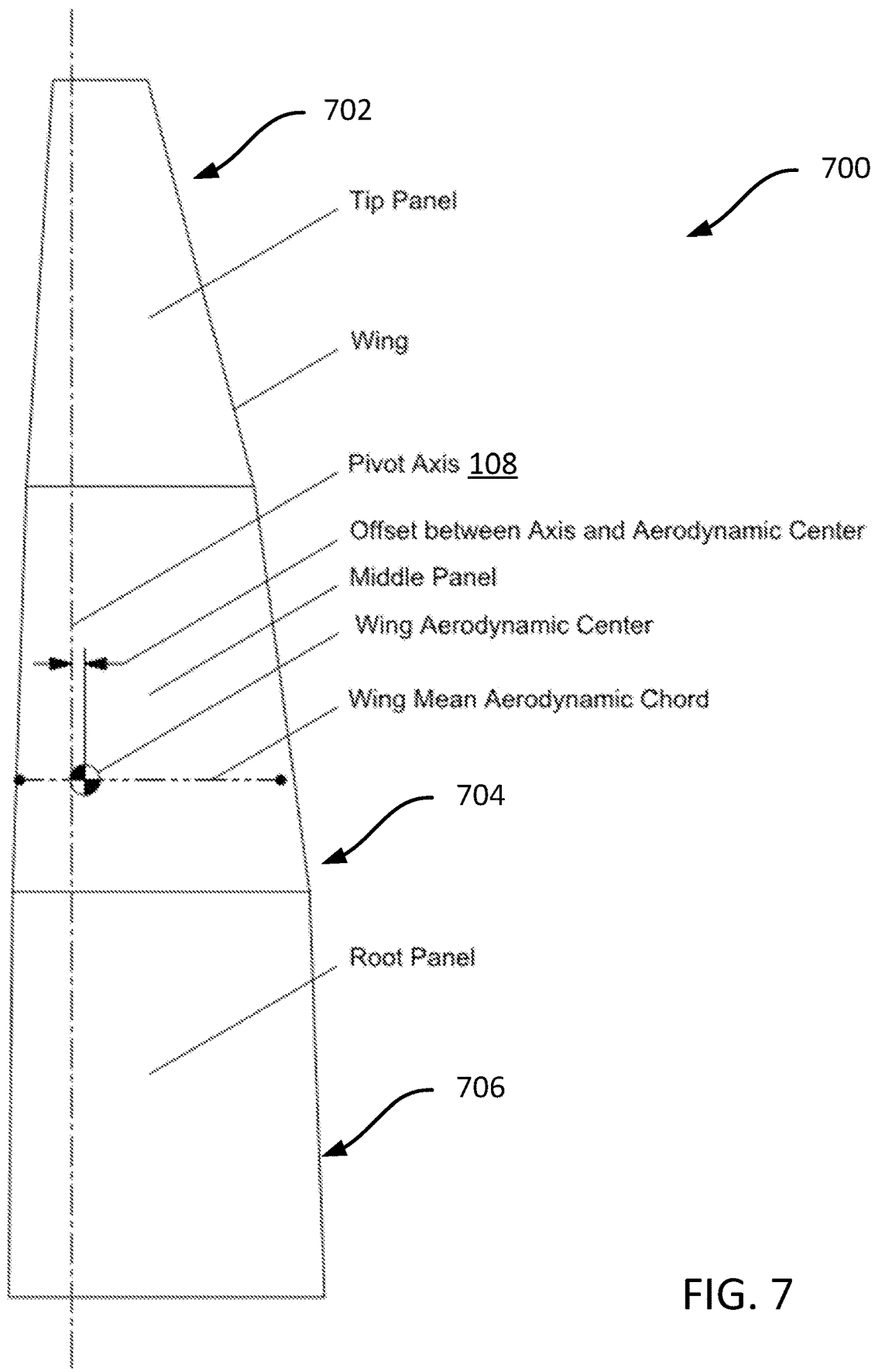
FIG. 7 is an illustration of an exemplary sailing wing.

FIG. 7 is an illustration of an exemplary sailing wing 700. The sailing wing 700 is free to rotate about a pivot axis 108 approximately aligned with the span of the sailing wing 700. This pivot axis 108 passes through the sailing wing 700 at a point slightly ahead of the sailing wing 700 aerodynamic center. This example sailing wing 700 is divided into three contiguous trapezoidal panels. Other sailing wing could have only one trapezoidal panels or a large number of panels 702, 704, and 706. The sailing wing 700 could also have a curved planform. The sailing wing 700 chord may have discontinuous jumps (there could be jumps in the leading or trailing edge). The sailing wing 700 (or its main sail) pivot axis 108 may be located approximately one percent to seven percent of the mean aerodynamic chord of the main sail ahead of the wing aerodynamic center.

The pivot axis 108 is shown as a vertical line of centerline style (dash-dot-dash). The sailing wing 700 mean aerodynamic chord is illustrated for the example planform. The quarter chord of the mean aerodynamic chord is indicated by the center of a circle called out as the sailing wing 700 aerodynamic center. This is the point about which the pitching moment is, in theory at least, invariable. Additionally, the aerodynamic center is the point at which the sum of the wing's lift acts. Because the aerodynamic center is behind the pivot axis 108, the sailing wing 700 naturally trails.

Figure 8:
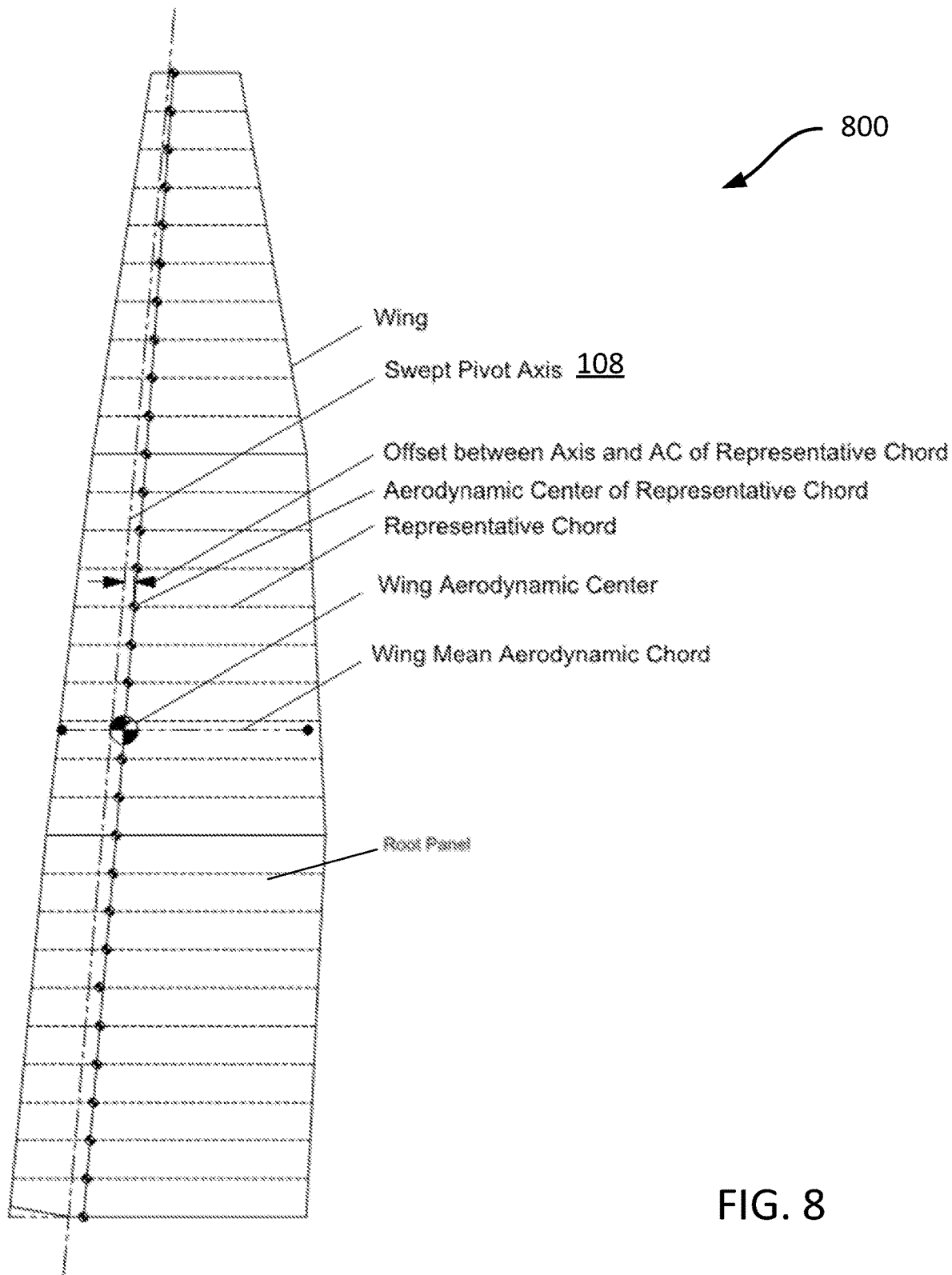
FIG. 8 is an example of a sailing wing in which a pivot axis and the sailing wing are swept aft.

FIG. 8 is an example of a sailing wing 800 in which a pivot axis 108 and the sailing wing 800 are swept aft. This is the sailing wing 800 of FIG. 8 is "sheared" aft to create, by way of example, five degrees of aft sweep about the 20% chord line. The pivot axis 108 is also sheared aft five degrees. Note that all chords remain strung on the pivot axis 108 at 20% of their chords. The offset between the whole sailing wing 800 aerodynamic center and the pivot axis 108 remains the same as the sailing wing 700.

A swept pivot axis 108 may significantly complicate the geometry of the mating surface of the sailing wing 800 with a boat or other vehicle. In this example, the mating surface will approximate a cone. The forward portion of the sailing wing 800 root panel may need to be trimmed back so that it does not conflict with the aft hull mating surface when the sailing wing 100 rotates 180 degrees. Likewise, the forward hull mating surface must rise up to form the conical depression centered at the pivot spindle if the mating gap is to be small.

Figure 9:
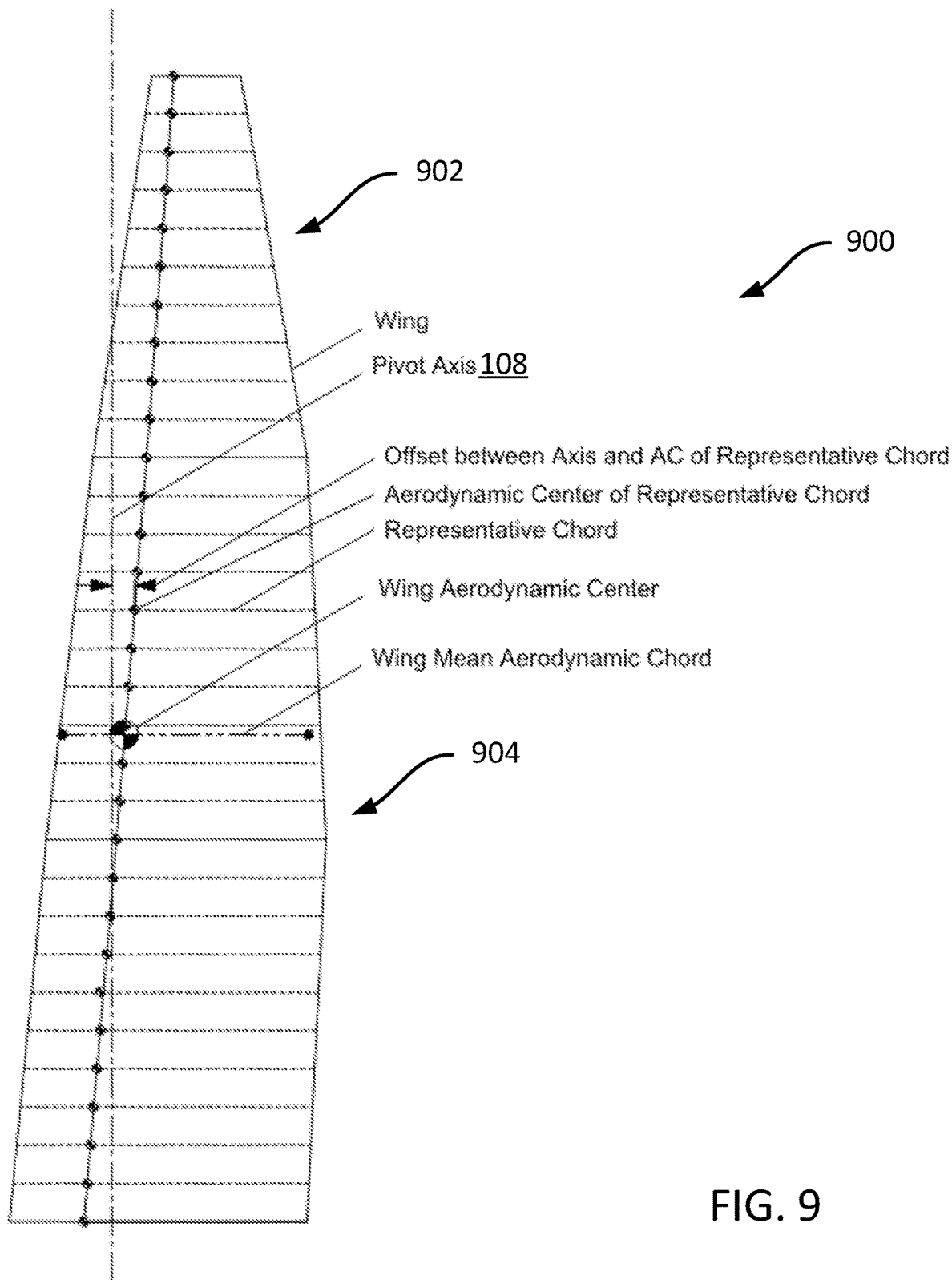
FIG. 9 illustrates a sailing wing having a vertical pivot axis, whereby the sailing wing is swept.

FIG. 9 illustrates a sailing wing 900 having a vertical pivot axis 108, whereby the sailing wing 900 is swept. In this case the offset between the sailing wing 100 aerodynamic center and the pivot axis 108 remains the same as the sailing wing 700 in FIG. 7. This means that the sailing wing 900 provides the same overall level of stability as the unswept variant. Taken on a chord-by-chord basis however, the chords are not strung on the pivot axis 108 at a constant chord fraction. This means that the lower section of the sailing wing 900 can be destabilizing while the upper section of the sailing wing 900 can be stabilizing.

In some examples, the sailing wing 900 can have some disadvantages. First, wind may not be uniform with height above the surface. It is commonly stronger at higher elevations. This has two compounding effects. The stronger wind aloft gives increased effectiveness to the upper portion of the sailing wing 900. Because this portion of the sailing wing 900 is highly stabilizing, the stability of the sailing wing 900 is increased. This means that increased control deflection is needed to change angle of attack. Second, stronger winds aloft interact with the forward speed of the boat to increase the angle of attack of the upper portion of the sailing wing 900. Because this portion of the sailing wing 900 is located well aft of the pivot axis 108, the sailing wing 900 tends to weathervane to a lower angle of attack. This compounds the need for additional control deflection. In some examples, increased control surface deflection is harmful to sailing wing 900 performance. And third, this arrangement may make it difficult or impossible to divide the sailing wing 900 into multiple, independent sections. In some examples, as illustrated in FIG. 9, the sailing wing 900 is divided into two sections, an upper section 902 and a lower section 904. Each section must be stable, but the lower section as shown in FIG. 9 is unstable because the quarter-chord of the lower sailing wing 900 is ahead of the pivot axis 108. The upper section, conversely, is excessively stable. This means that it will require excessive control surface deflection to change angle of attack sufficiently and its performance will be poor. In short, multiple, independent segments may be difficult or impossible.

Figure 10:
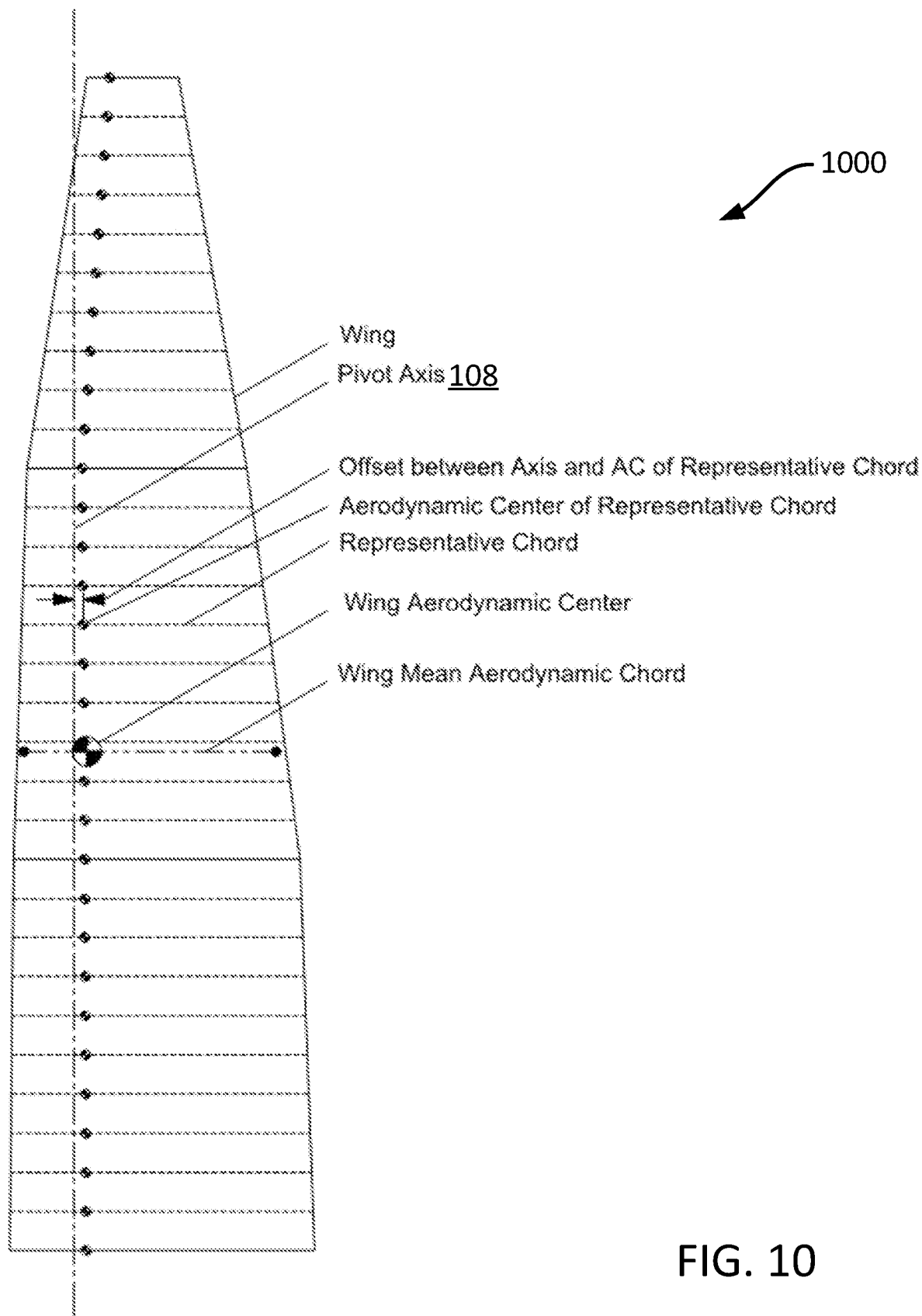
FIG. 10 illustrates a partially swept sailing wing.

FIG. 10 illustrates a partially swept sailing wing 1000. The algorithm that defines the relationship of chords to a reference axis may be more complex that simply specifying a single chord fraction along the entire span. It is possible to sweep some portions of the sailing wing 1000 more than others. This sailing wing 1000 has zero sweep angle about the 20% chord reference line for the root and middle panels. The tip panel, however, is swept five degrees aft. Variations such as this may provide subtle and unforeseen benefits to sailing wing 1000 performance. In some examples, the sailing wing 1000 retains the same offset between the whole sailing wing aerodynamic center and the pivot axis 108, as with the examples above. Further, each individual chord has its aerodynamic center behind the pivot axis 108.

Figure 11:
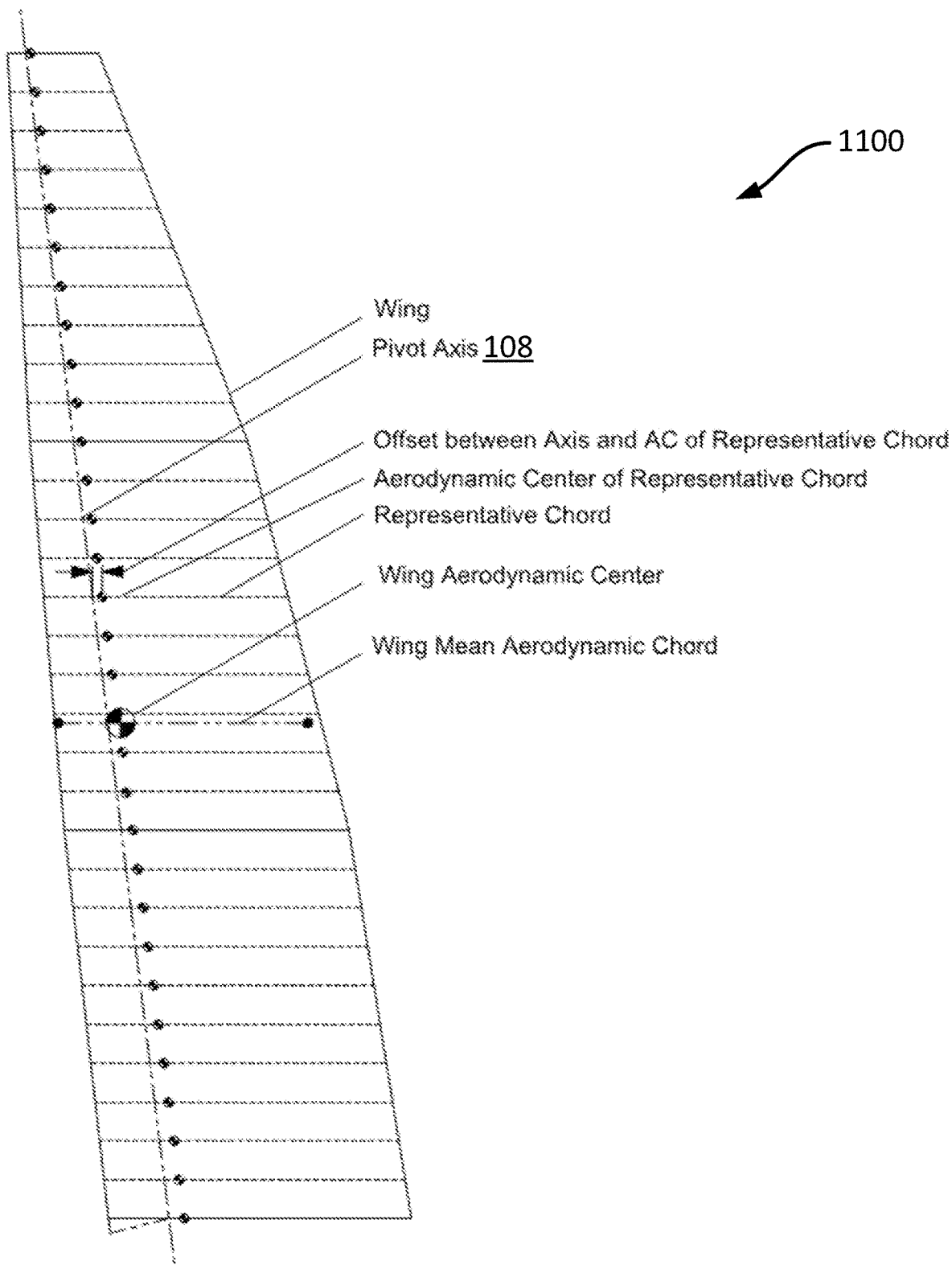
FIG. 11 illustrates a forward swept sailing wing.

FIG. 11 illustrates a forward swept sailing wing 1100. The sailing wing 1100 and pivot axis 108 may be swept forward. Such an arrangement places the quarter chord well forward of the pivot axis 108 at the root. Another effect is that the sailing wing 1100 root rib sweeps a cone that will shape the mating surface of the hull.

Figure 12:
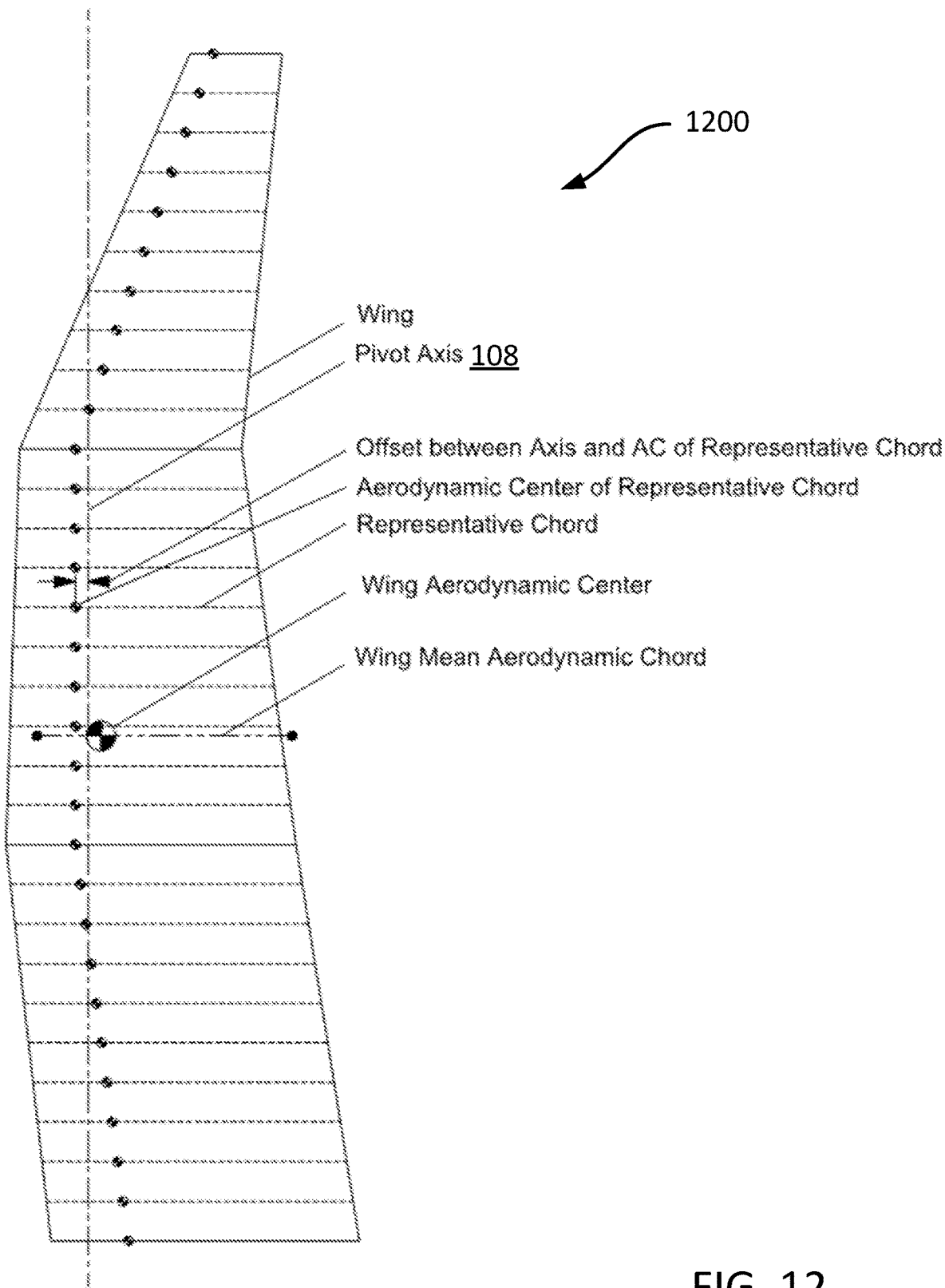
FIG. 12 illustrates a crescent-shaped sailing wing.

FIG. 12 illustrates a crescent-shaped sailing wing 1200. This example sweeps the root panel forward by 7° and the tip panel aft by 20° while leaving the middle panel unswept. Such a planform results in the three panels providing substantially different levels of stability as shown by the location of the chord mean aerodynamic chord ("MAC")/4 locations. The root panel is relatively stable; the middle panel is quite unstable; the tip panel is very stable. Such a sailing wing 1200 will vary in stability with variations in wind gradient characteristics.

Figure 13:
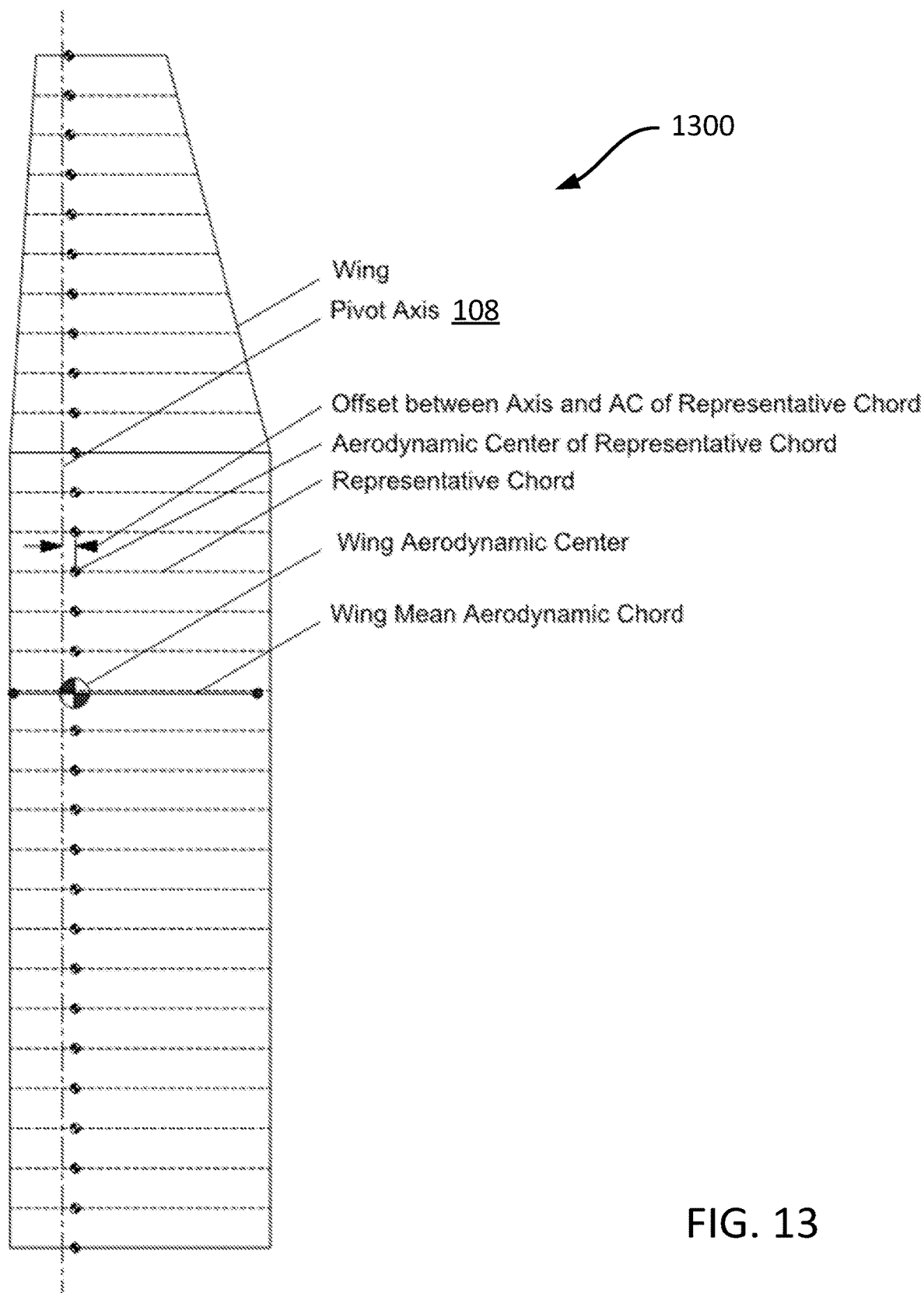
FIG. 13 illustrates a partially constant-chord sailing wing.

FIG. 13 illustrates a partially constant-chord sailing wing 1300. The sailing wing 1300 may employ any number of panels greater than or equal to one. FIG. 13 illustrates a sailing wing 1300 with two panels. Furthermore, this sailing wing 1300 features a constant-chord root panel. This may be advantageous if rib tooling is expensive—many of the ribs are the same. One drawback is a higher MAC location than the other examples shown. Another drawback is a relatively small root chord which may limit spar depth and result in increased spar weight. Lastly, the lift distribution for this sailing wing 100 may be loaded too much toward the tip, increasing induced drag.

Figure 14:
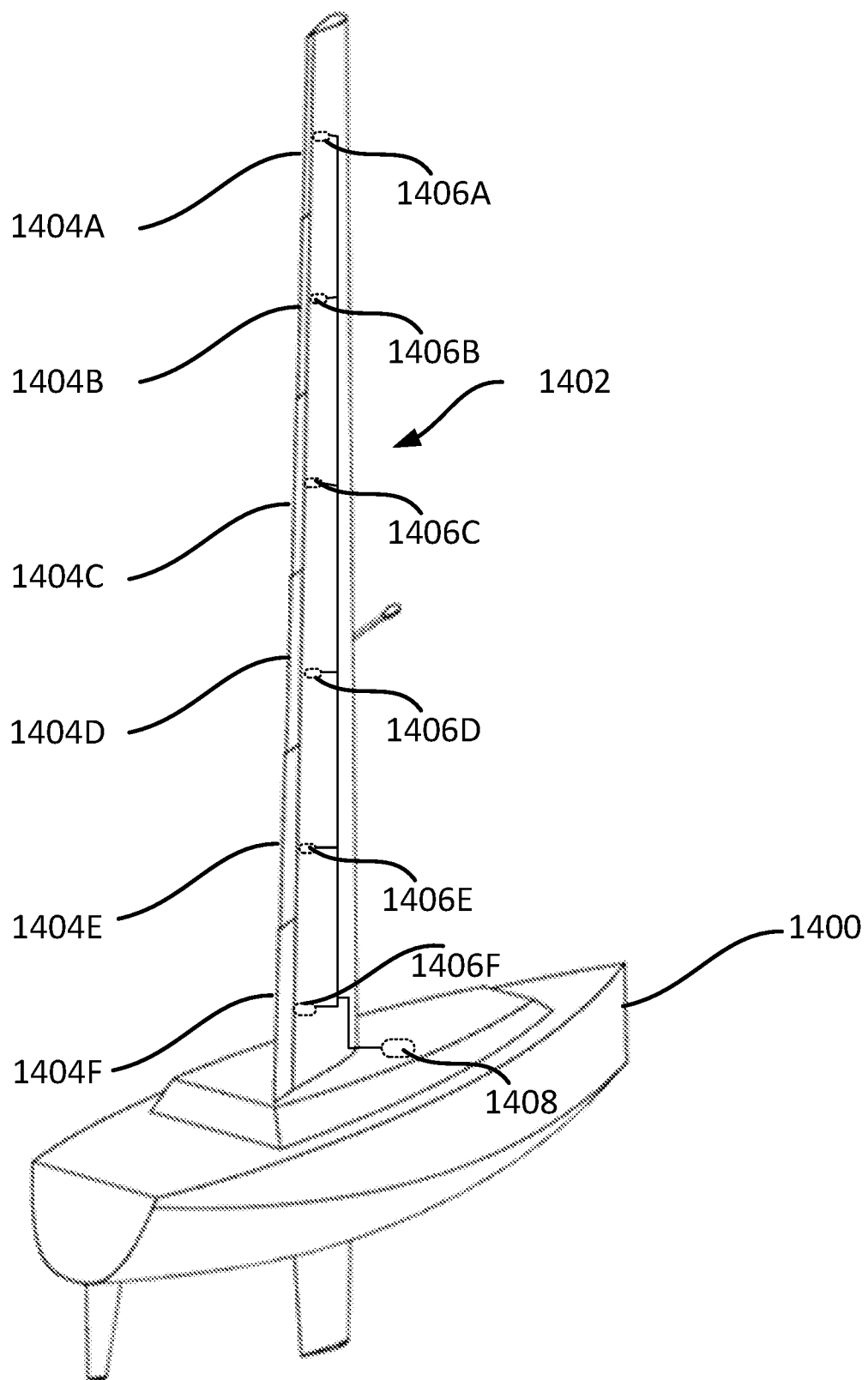
FIG. 14 is an example of a sailing wing with individually controllable control surfaces.

In some examples, it may be useful for a boat 1400 to have a sailing wing with multiple control surfaces. FIG. 14 is an example of a sailing wing 1402 with individually controllable control surfaces 1404A-1404F (individually referred to herein as "the control surface 1404A," the control surface 1404B," and so forth, and collectively as "the control surfaces 1404"). The rotation (or deflection) of the control surfaces 1404 about an axis may be controlled by actuators 1406A-1406F (individually referred to herein as "the actuator 1406A," the actuator 1406B," and so forth, and collectively as "the actuators 1406"). The actuators 1406 may be controlled individually, collectively, or in a group using an actuator controller 1408. The actuator controller 1408 is in communication, wired or wireless, with the actuators 1406. One or more of the control surfaces 1404 may controlled using other means such as, but not limited to, mechanical linkages, rope/pulley systems, and the like. The presently disclosed subject matter is not limited to any particular manner of providing the motive force to cause the movement of the control surfaces 1404.

There may be various reasons for controlling different segments of the sailing wing 1402. These segments may be deflected in concert (the same amount) or differentially. For example, it is not unusual for the wind near the water's surface to behave differently than the wind further up. Having multiple control surfaces 1404 allows a pilot or user to adjust the deflection of one or more of the control surfaces 1404 to take advantage of the wind conditions experienced by the individual one of the control surfaces 1404 rather than handling the wind conditions as an "aggregate" condition.

Having multiple control surfaces 1404 allows a pilot or user to optimize lift distribution for minimum induced drag, including effects of wind gradient, and optimize lift distribution for minimum induced drag for non-optimum planforms. Additionally, having multiple control surfaces 1404 allows a pilot or user to bias lift distribution of the sailing wing 1402 downwards for reduced heeling moment and increased thrust. Additional benefits include, but are not limited to, providing roll (heel angle) damping, pitch angle damping, and additional drag.

As discussed above, lift distribution may also be favorably adjusted to account for the wind gradient. Wind strength tends to increase with height above the water's surface. This increases sailing wing 1402 angle of attack on the upper portion of the sailing wing 1402, leading to increased heeling moment and, possibly, a less favorable lift distribution. This effect can be ameliorated by increasing the control surface 1404 negative deflection on the upper portion of the sailing wing 1402 and compensating with increased (less negative) deflection of the control surface 1404 on the lower portion of the sailing wing 1402. The sailing wing 1402 can also have a middle portion (not shown) between the upper portion and the lower portion. The optimum arrangement of the control surface 1404 deflection for each condition can be estimated theoretically or by sailing trials. In the second example above, the control surface 1404 twist arrangement would approximately compensate for a wind gradient that results in an effective five-degree sailing wing 1402 twist ("washin").

Lift distribution may be quickly adjusted if the control surface 1404 angles may be quickly changed. This can be used to oppose higher-frequency motions of the boat 1400. For example, swells may tend to make the boat 1400 roll back and forth in an undesirable way. Such motions may be opposed by quickly adjusting the sailing wing 1402 lift distribution. For example, the boat 1400 may be heeled to the right with the wind coming from the left. A roll motion to the right may be quickly opposed by moving the lift distribution downwards where it has a reduced tendency to heel the boat 1400. A return roll motion to the left may be opposed by moving the lift distribution upwards. This is achieved by rapid differential deflection of the control surface 1404 without changing the overall sailing wing 1402 angle of attack which, due to its larger mass moment of inertia, is slower to respond to changes in the control surface 1404 angle.

Figure 15:
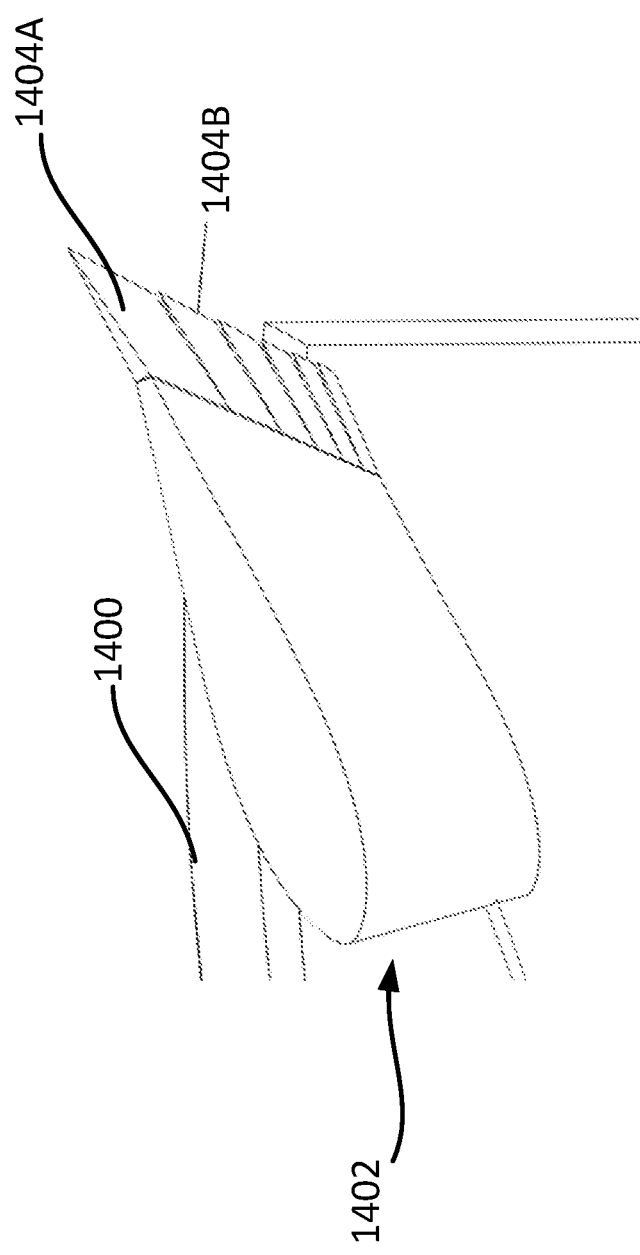
FIG. 15 is a top down view of a sailing wing with multiple, individually controllable control surfaces.

FIG. 15 is a top down view of the sailing wing 1402 with multiple, individually controllable control surfaces 1404A and 1404B. As shown in FIG. 15, the control surface 1404A has a higher degree of deflection than control surface 1404B, creating a deflection gradient that can be used to take advantage of the wind conditions at various points along the sailing wing 1402 or to create other conditions, such increased drag, as described above.

Figure 16:
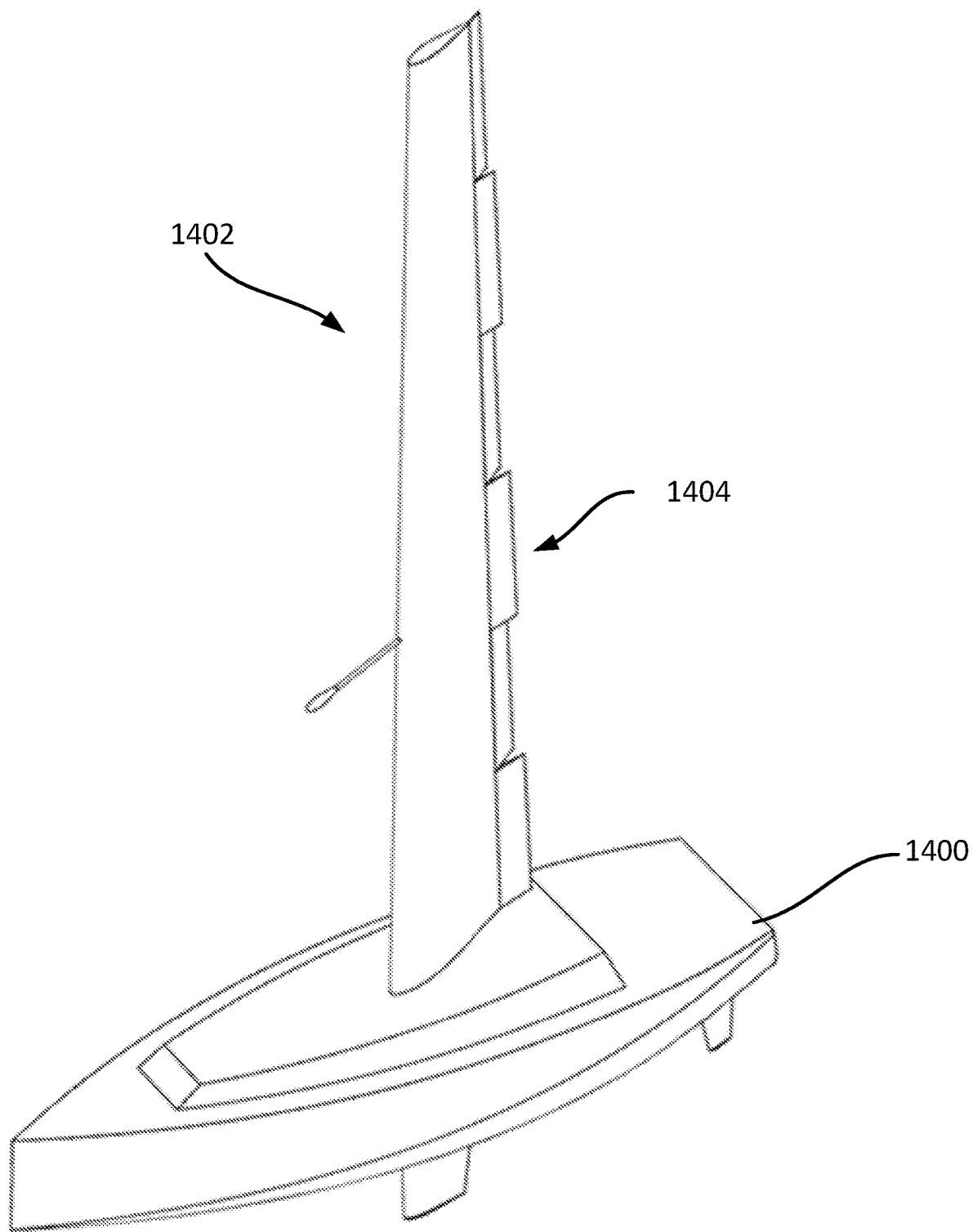
FIG. 16 is a side view of a boat having a sailing wing with multiple, individually controllable control surfaces configured to increase drag.

FIG. 16 is a side view of the boat 1400 having a sailing wing 1402 with multiple, individually controllable control surfaces 1404 configured to increase drag. If numerous control surfaces 1404 are used, it is possible to purposefully increase the drag of the sailing wing 1402. This may be done, for example, by alternating deflection of the control surfaces 1404 in a left-right-left-right fashion ("snaggletooth" configuration). This may be used to substantially increase both induced drag (with smaller surface deflections) as well as parasitic drag (with larger deflections). Drag may be increased in this way uniformly across the span of the sailing wing 1402 or it may be concentrated in a favorable area. Uniform drag may be beneficial to gently slow the boat 1400 or backing the boat 1400 when the boat 1400 is pointed directly upwind. Focused drag may be used to damp the boat's 1400 pitch oscillations. In this case, drag near top of the sailing wing 1402 is most beneficial. When the boat 1400 is pitching nose-down, drag can be applied to oppose (damp) that motion. Drag deflections would be zeroed during the nose-up motion.

Figure 17:
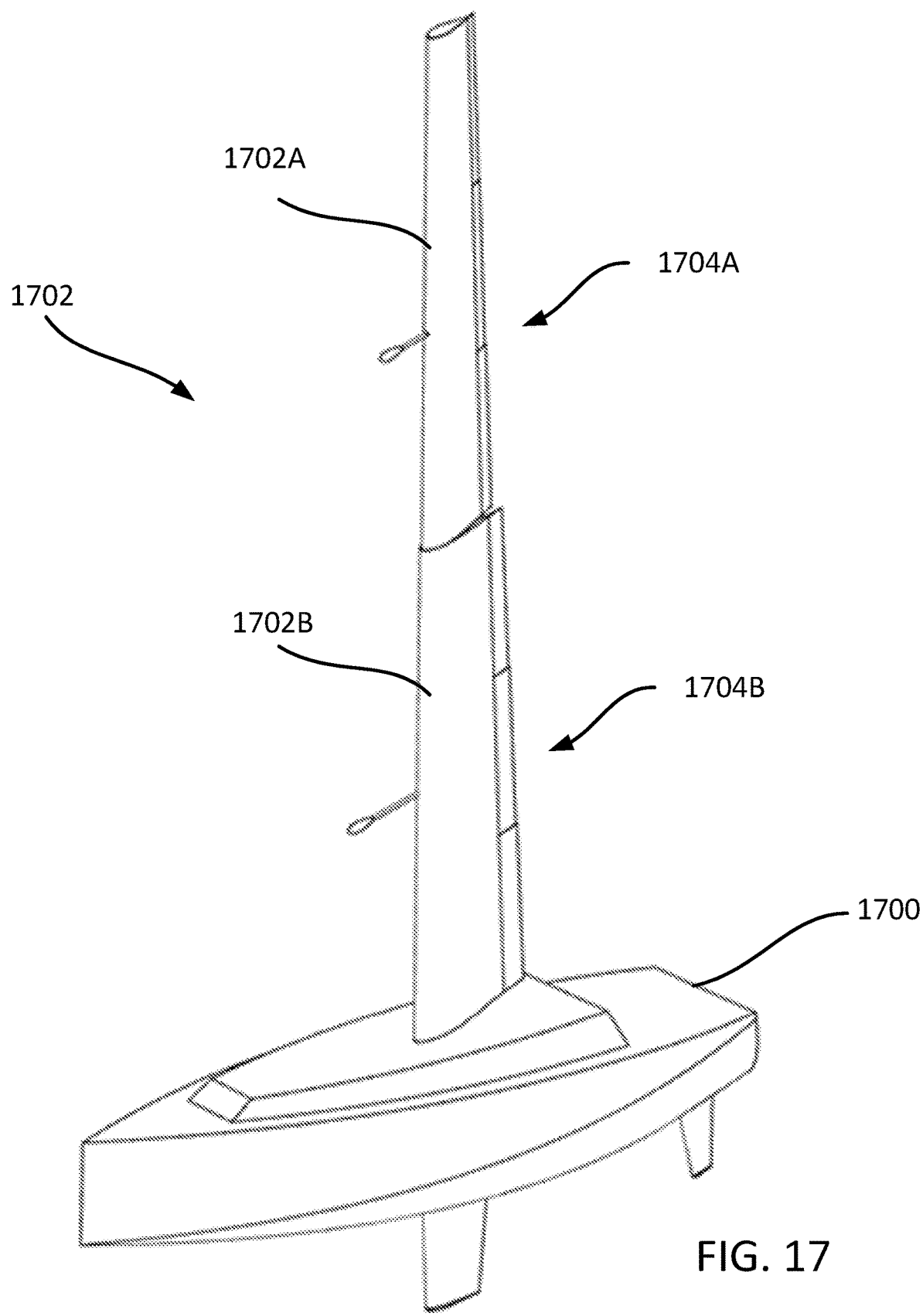
FIG. 17 is a side view of a boat having multiple sailing wing segments.

FIG. 17 is a side view of a boat 1700 having multiple sailing wing 1702 segments. As illustrated, the sailing wing 1702 has individually controllable segments 1702A and 1702B that are proximate to each other and are individually rotatable about a pivot axis 108 running through the sailing wing 1702. The segments 1702A and 1702B may be controlled using various mechanical and/or electrical means, such as an actuator system as described above, or may be controlled by their individual control surfaces. The segment 1702A may have individually controllable control surfaces 1704A. The segment 1702B may have individually controllable control surfaces 1704B. The segment 1702B may be free to rotate with respect to the hull of the boat 1700. The segment 1702A may be free to rotate with respect to the segment 1702B. Each segment 1702A and 1702B may be independently self-trimming and may be controlled by one or more control surfaces 1704.

Division into multiple segments may provide benefits in certain cases. In the case of a higher speed sailboat, boundary layer effects of apparent wind strength and angle along the sailing wing 1702 span may be too great to be effectively addressed by control surface 1704 deflection alone. By dividing the sailing wing 1702 into multiple segments, each segment can independently self-trim to the local apparent wind angle. Division of the sailing wing 1702 into multiple segments may also ease manufacturing, disassembly and transport of the boat by reducing the size of sailing wing 1702 panels.

A potential drawback of a multiple-segment sailing wing 1702 is reduced roll (heel) rate damping. For example, if the boat 1700 is rolling back in forth in a big swell each sailing wing 1702 segment will tend to align with the apparent wind (local flow). The segment 1702A will see a greater change in apparent wind angle than the segment 1702B because this segment is farther from the roll axis and moves laterally more quickly. With a single-segment sailing wing, the upper portion of the sailing wing is linked to the lower portion and does not align with the apparent wind so well. Instead, its angle of attack during roll motion tends to oppose the motion, providing damping. By comparison, multiple segments tend to align well and provide much less roll damping. This drawback may be addressed with active roll damping. This may be provided by linking a roll sensor to the control of the upper segment(s) control surfaces 1704A so that roll motion is opposed by a change in attack of the segment 1702B as a whole.

Figure 18:
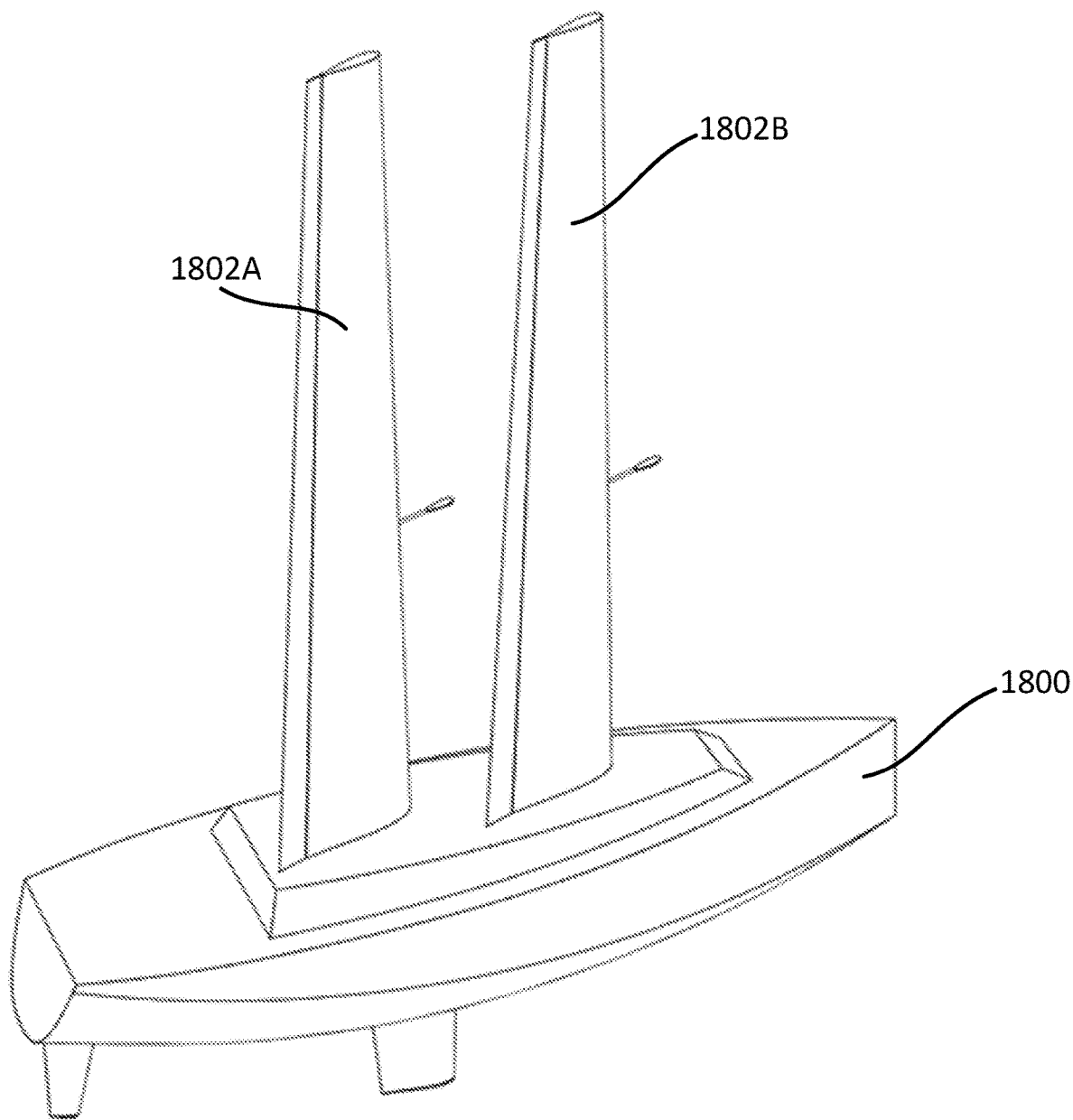
FIG. 18 is an illustration of a boat with multiple sailing wings.

FIG. 18 is an illustration of a boat 1800 with multiple sailing wings 1702A and 1702B. In some cases, it may be favorable to employ multiple sailing wing 1802A and 1802B instead of a single sailing wing. A benefit of this arrangement is increased sail area within a given span and chord constraint. This can provide a benefit of increased thrust and boat speed, especially in lighter wind conditions. Alternatively, equal sail area can be provided with less sailing wing chord and/or span. This can provide a benefit by enabling mooring in a more compact space while preserving the sailing wing ability to self-align with the wind. Multiple sailing wings with a span less than that of a single sailing wing can provide approximately equal thrust with less heeling moment. This can enable the boat to operate comfortably in greater wind. Alternatively, the sailboat may be designed with a lighter keel, thereby reducing hull drag and improving performance.

A potential additional benefit of longitudinally-spaced multiple sailing wings is their ability to provide different amounts of lift. This can provide a capability to trim a turning moment in the hull, for example. Both sailing wings 1702A and 1702B can be controlled from a common input.

Figure 19:
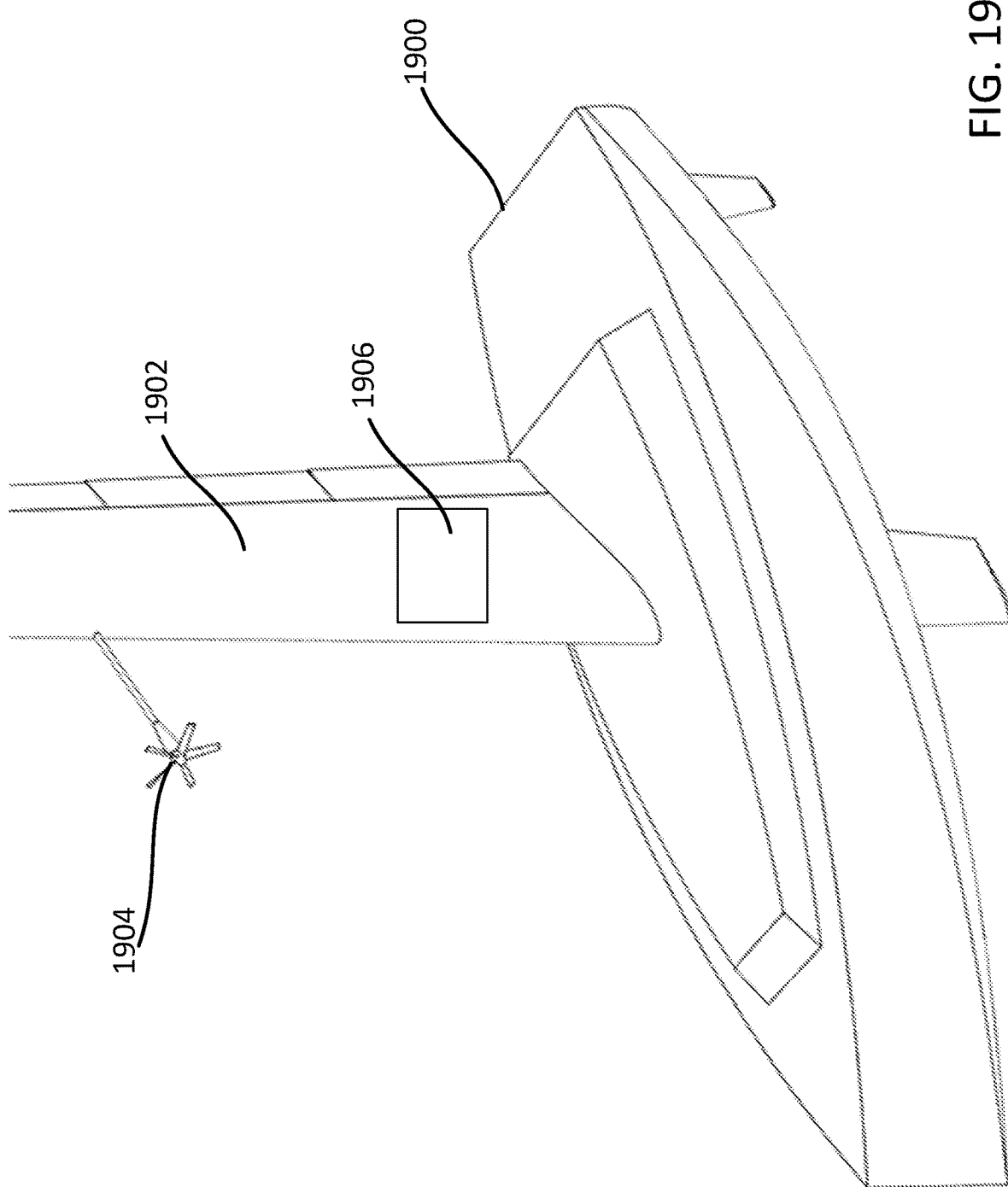
FIG. 19 is an illustration of a boat with a sailing wing having an energy capture device.

FIG. 19 is an illustration of a boat 1900 with a sailing wing 1902 having an energy capture device 1904. The use of wind turbines on sailboats to gather wind energy is well known. However, in existing sailboats, wind turbines provide no benefit other than energy. Their weight and drag are detrimental. The boat 1900 can benefit from the weight of the energy capture device 1904 when it is used as a mass balance. Energy from the energy capture device 1904 (which is a wind turbine in this FIG. 19) can be stored in a battery within the sailing wing 1902 or mass balance to power control systems as well as other potential systems in the sailing wing 1902. Alternatively, or additionally, this energy can be transmitted to the hull where it can be stored, for example, in a large battery. Transmission from the sailing wing 1902 to the hull may be accomplished with slip rings or an inductive coupler.

Other types of energy capture devices 1904 may be used. For example, solar panels may be used. In contrast to the flexible nature of cloth sails, the rigid structure of the sailing wing 1902 can support rigid photovoltaic solar panels. These may be attached to the outer surface of the sailing wing 1902, illustrated as panel 1906, or to interior structure such as ribs or spar webs where they can be illuminated through a transparent or translucent sailing wing 1902 skin that also protects the cells from the environment. Electrical energy from these panels can be stored in a battery within the sailing wing 1902 to power control systems as well as other potential systems in the sailing wing 1902. Alternatively, or additionally, this energy can be transmitted to the hull where it can be stored, for example, in a large battery. Transmission from the sailing wing 1902 to the hull may be accomplished with slip rings or an inductive coupler. In some examples, energy from a large battery in the hull may, for example, be used to power an electric motor that drives a propulsion propeller. The battery may also be charged by a generator driven by a combustion engine to provide a hybrid-electric propulsion system.

Energy from solar panels, wind turbines or batteries may be converted to hydrogen by applying electrolysis to water. This hydrogen may, for example, be compressed and stored in a tank. Hydrogen may later be used in a fuel cell to create electrical power or it may be burned in a combustion engine to create mechanical power. This system provides a pathway to a free-standing propulsion system that may provide high power and long endurance without reliance on refueling at ports. Stored energy may also be used to power the boat's systems such as electronics, environmental control systems and lighting.

FIGS. 20-24 are illustrations of a sailing wing used in a configuration that allows the sailing wing to be canted. Shown in FIGS. 20-24 are a pivot axis of the sailing wing that may be connected to a secondary axis substantially parallel to the hull's longitudinal axis. The sail may then be canted to the side with respect to the hull. Additionally, one or more sailing wing can be connected to this secondary axis and may be canted together. The following describes a single sailing wing but this also applies to more than one sailing wing.

Figure 20:
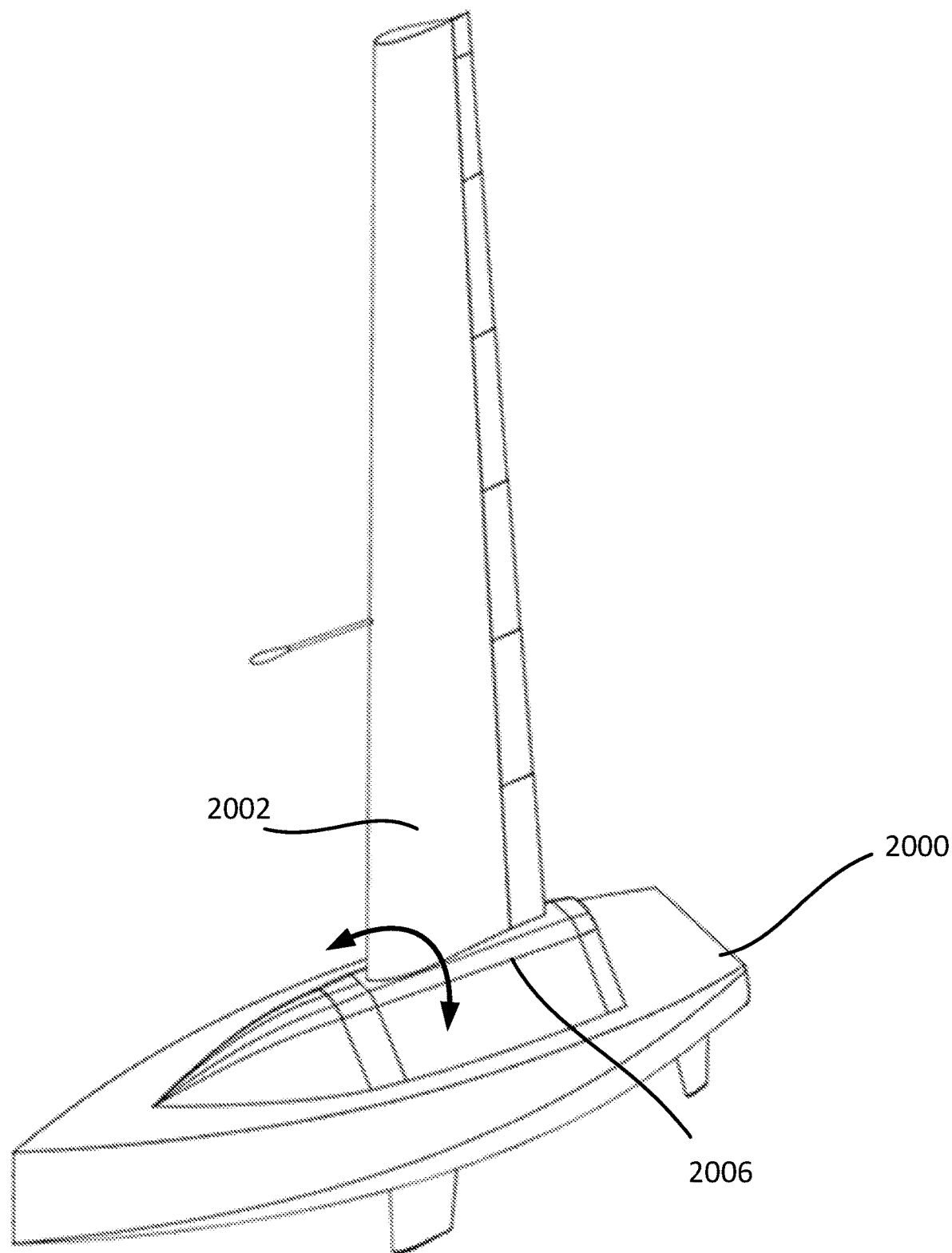
FIGS. 20, 21, 22, 23, and 24 are illustrations of a sailing wing used in a configuration that allows the sailing wing to be canted.
Figure 21:
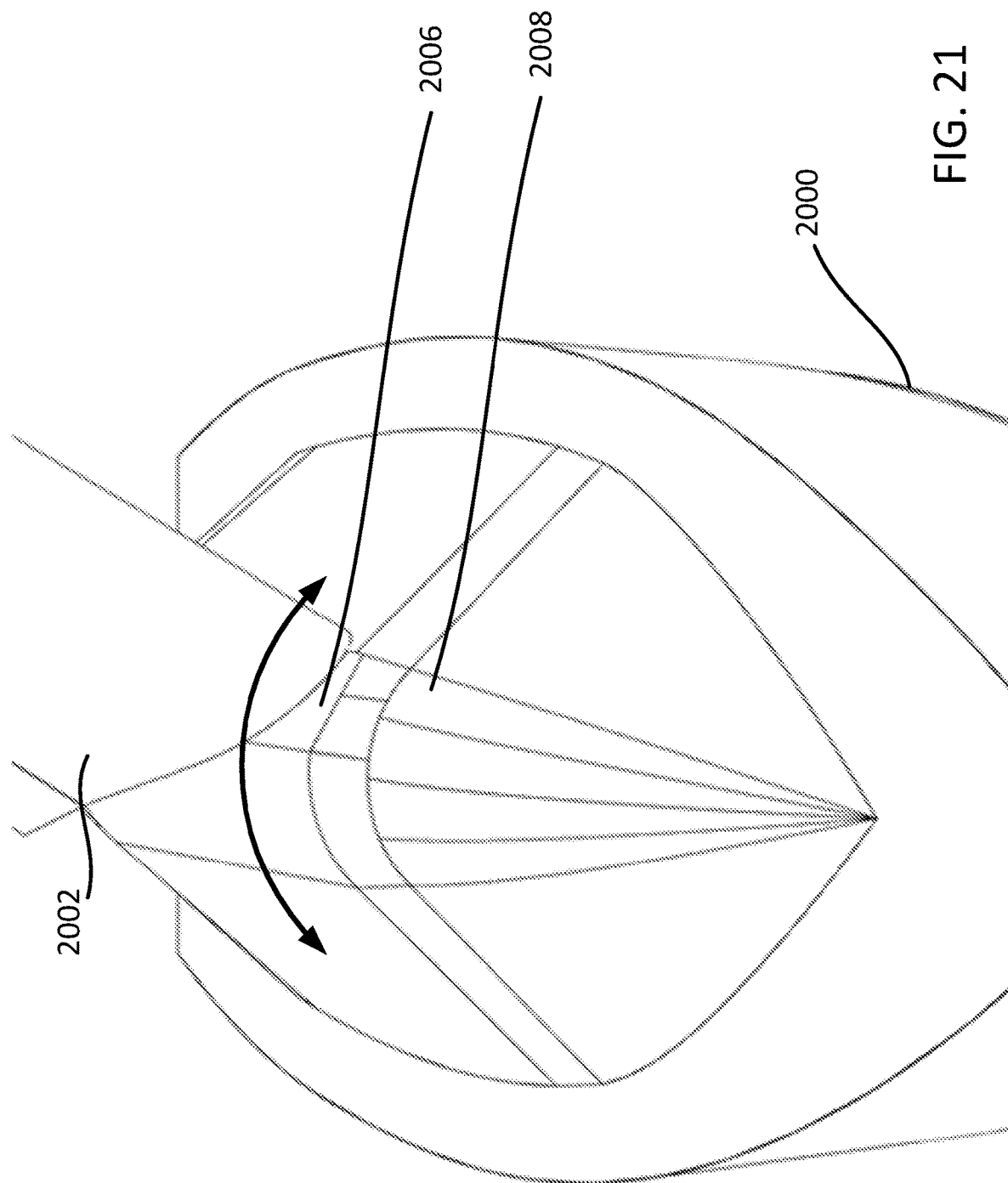

In FIG. 20, a boat 2000 is fitted with a secondary, longitudinal, axis 2006 that enables a sailing wing 2002 to cant to either side. FIG. 21 is a closeup of a drum-like surface 2008 that fairs the sailing wing 2002 support to the boat 2000. The drum 2008 incorporates a flat that enables the sailing wing 2002 root to aerodynamically seal over a modest range of sailing wing 2002 incidence.

Figure 22:
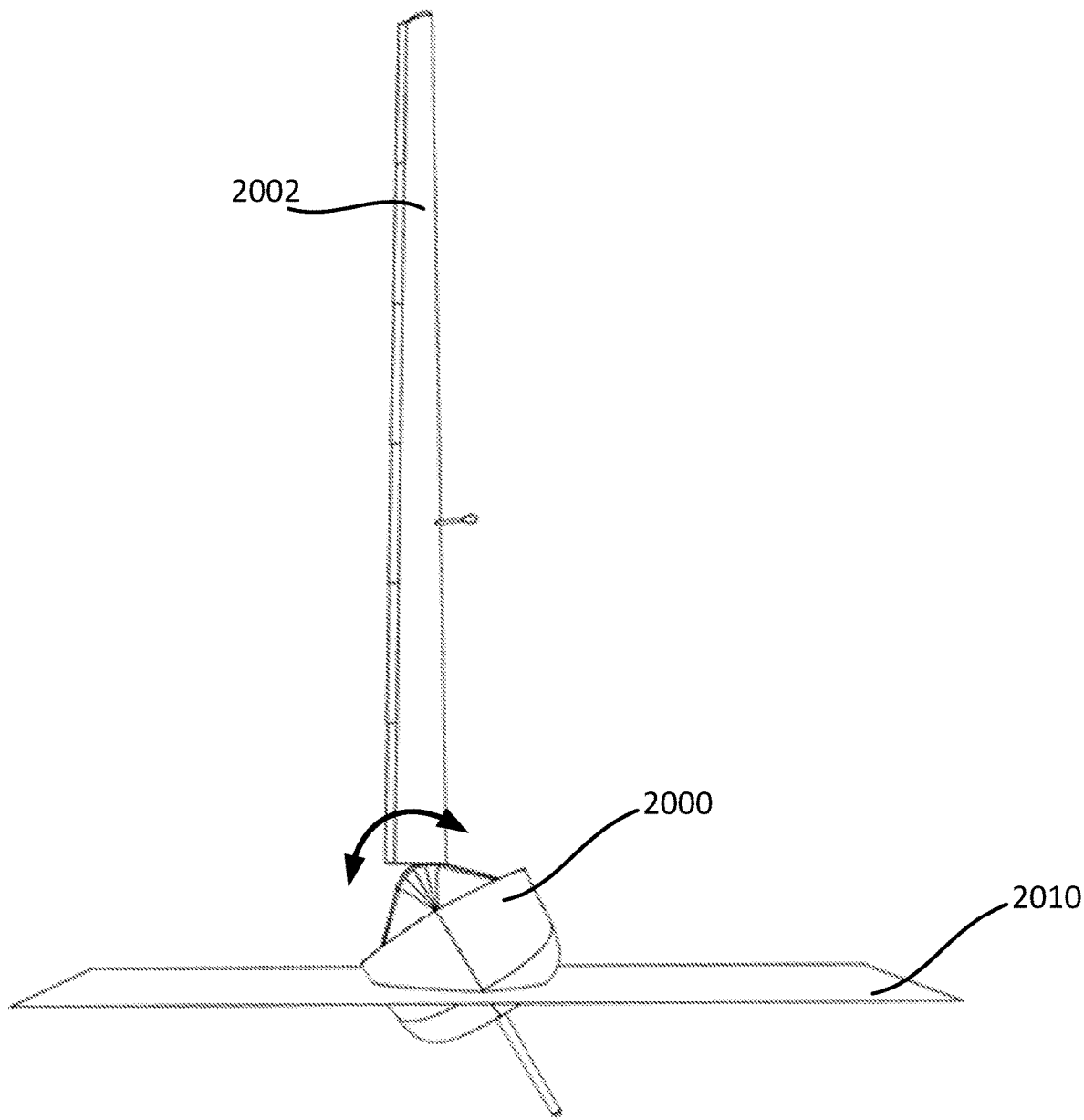

In the case of a mono-hull boat, the sailing wing 2002 may be canted to windward as the hull heels from the moment of the sailing wing 2002. If the sailing wing 2002 is canted to a vertical orientation, thrust of the sailing wing 2002 is increased while reducing the downward component of its lift that presses the hull into the water. A secondary advantage is that the weight of the sailing wing 2002 is no longer tending to heel the boat to leeward. This is illustrated in FIG. 22 where the boat 2000 is shown in front view on a port tack. The hull of the boat 2000 is heeled to starboard but the sailing wing 2002, being canted to port, is upright. The water plane 2010 is indicated (cutting through the hull) to clarify the hull's heel angle.

Figure 23:
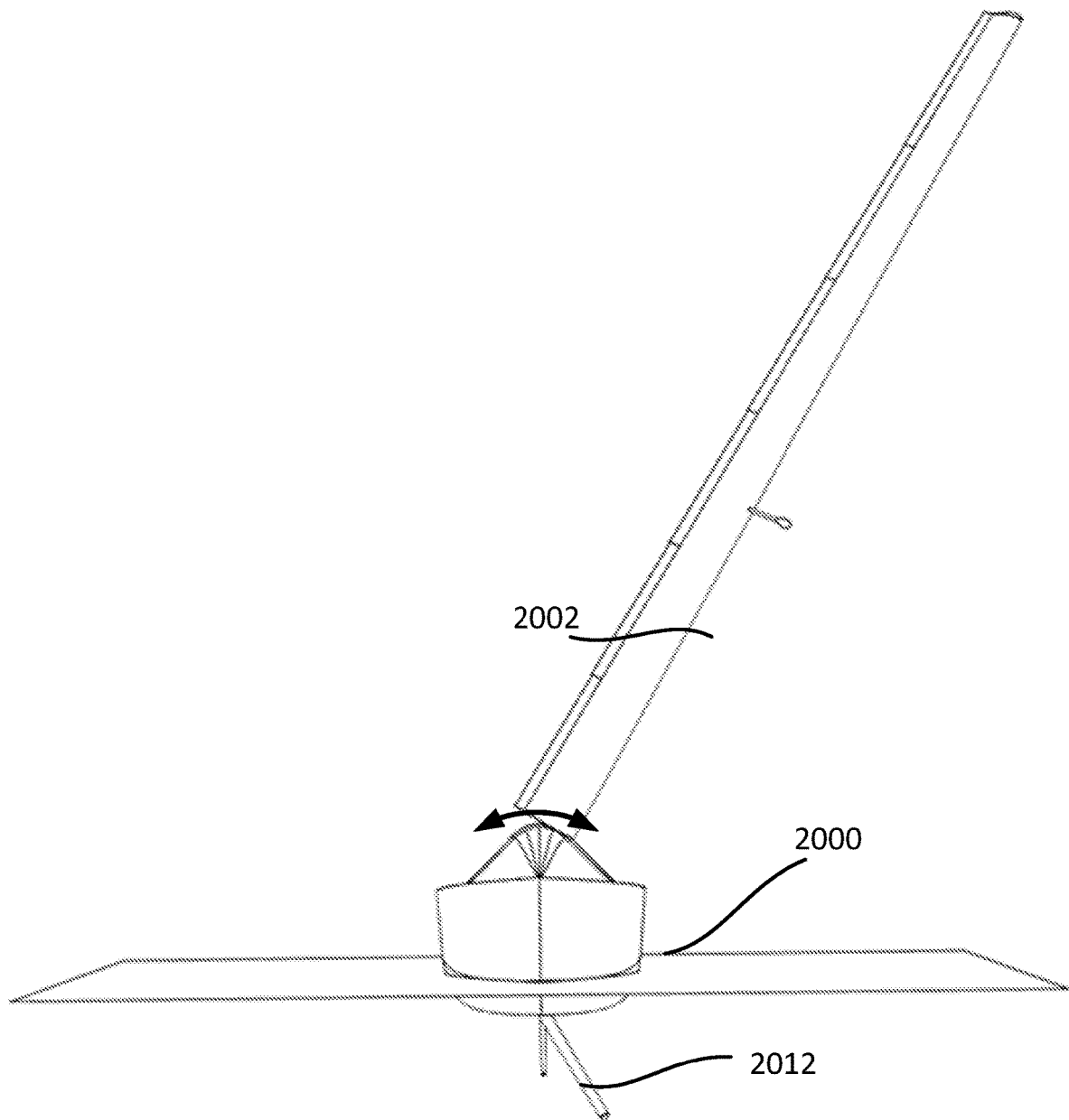

In the case of a mono-hull or multi-hull boat (e.g. catamaran), the sailing wing 2002 may be canted to windward even farther. This can tend to lift the hull from the water, potentially reducing hull drag and increasing speed. The weight of the sailing wing 2002 is also on the windward side of the boat, reducing heeling moment. This is illustrated in FIG. 23 in which the boat 2000 is shown in front view on a port tack. In this example, the boat 2000 includes a canting keel 2012 that tends to right the hull. Some existing mono-hull boats use the canting keel 2012 to reduce the amount that the boat (and sail) heel. This is achieved by canting a heavily-weighted keel 2012 toward the windward side of the hull. Canting keels 2012 and a canting sailing wing 2002 can be used together for additive benefits.

Figure 24:
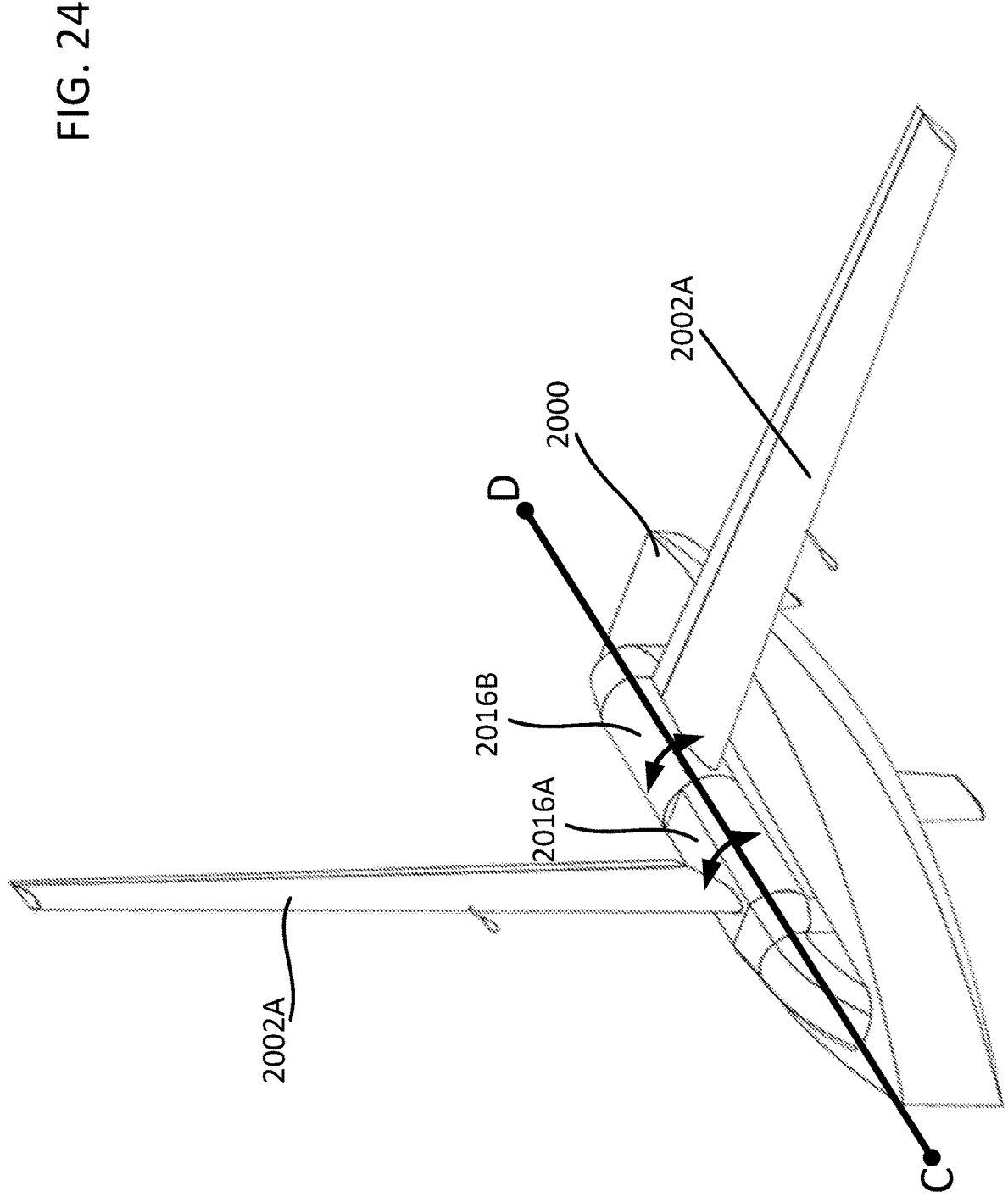

FIG. 24 shows the boat 2000 with multiple, cantable sailing wings 2002A and 2002B. The sailing wing 2002A is axially rotatably affixed to rotatable drum 2016A and the sailing wing 2002B is axially rotatably affixed to rotatable drum 2016B. In FIG. 24, the sailing wing 2002B has been canted to a 90 degree angle from the upright cant shown by the sailing wing 2002A. As shown in FIG. 24, the sailing wings 2002A and 2002B are rotatable about axis CD that runs through the boat 2000.

Figure 25:
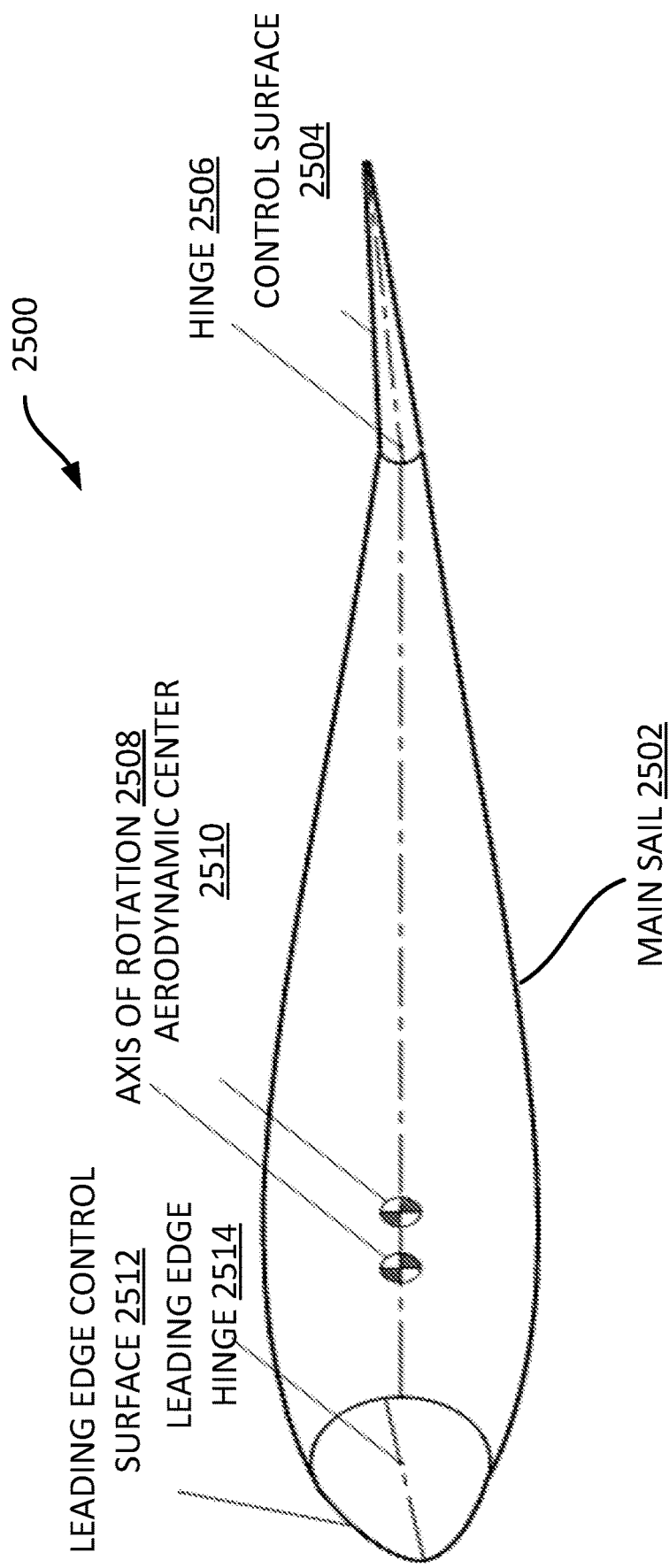
FIG. 25 is an illustration of a sailing wing having a main sail with a leading edge control surface.

FIG. 25 is an illustration of a sailing wing 2500 having a main sail 2502 with a leading edge control surface. The main sail 2502 is free to rotate about a pivot axis at an axis of rotation 2508 approximately aligned with the span of the main sail 2502. This axis of rotation 2508 passes through the main sail 2502 at a point slightly ahead of the main sail 2502 aerodynamic center 2510. The main sail 2502 includes a control surface 2504 that rotates about a hinge 2506, the control surface 2504 located proximate to the aft portion of the main sail 2502. The main sail 2502 also includes a leading edge control surface 2512 that is rotatable about a leading edge hinge 2514, located at the leading area of the main sail 2502. In some examples, the leading edge control surface 2512 is individually controllable in relation to the control surface 2504. In other examples, the motion of the leading edge control surface 2512 may be mechanically linked to the control surface 2504 so that both may be controlled by a single actuator. The leading edge control surface 2512 may be deflected to a windward side ("drooped") while the control surface 2504 may be deflected to the leeward side ("reflexed"), or vice versa. In some applications, leading edge control surface 2512 droop may enable the main sail 2502 to achieve greater maximum lift, increasing thrust.

Figure 26:
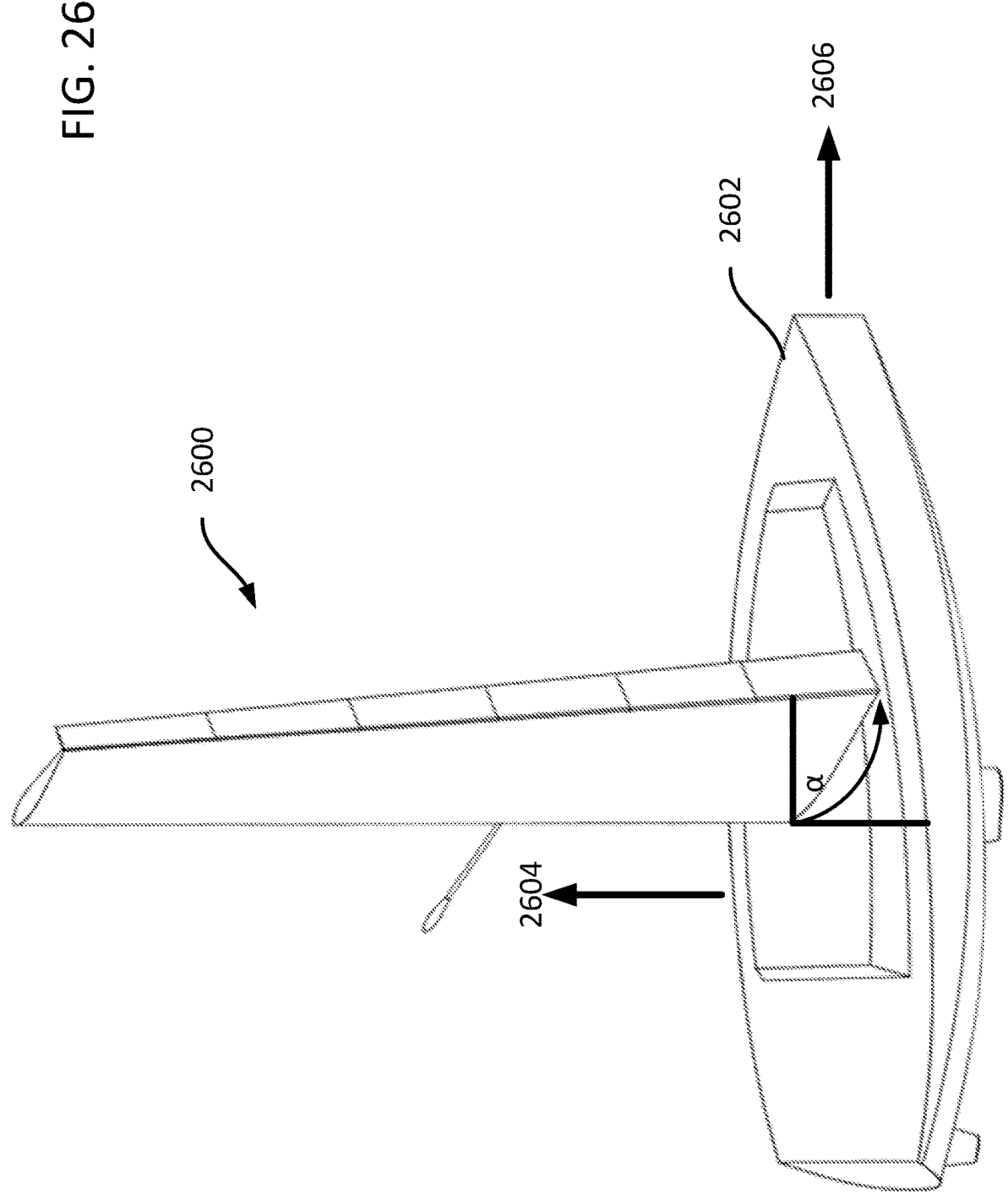
FIG. 26 is an illustration showing a deep stall mode for downwind sailing using a sailing wing of a boat.

FIG. 26 illustrates a deep stall mode for downwind sailing using a sailing wing 2600 of a boat 2602. When sailing directly downwind, sail lift of the sailing wing 2600 may be orthogonal (shown as vector 2604) to the boat's 2602 path (shown as vector 2606) and provides no thrust. Only sail drag provides thrust. Sail drag (and thus thrust) can be substantially increased by employing a "deep stall" mode that pitches the sail to a high angle of attack a. This may be achieved by deflecting the control surfaces a large amount, in the range of 30 degrees to 90 degrees (shown as approximately 45 degrees in FIG. 26).

Some additional advantage or modifications of various examples of the presently disclosed subject matter may be one or more of the following.

The subject matter supports automation. This can be as simple as the algorithms that convert the basic manual control inputs into control surface deflections. It can be as complicated as full autonomous operation. The subject matter described herein is well-suited for automation for several reasons: All sailing wing control inputs can be computer-mediated and can be effected without hands-on effort. The remaining primary boat control input is the rudder which may be automated (mechanized and controlled by electronic signal). The sailing wing and hull primary controls may require very little power. Under sail, the boat can operate continuously without much operator attention to energy reserves.

Primary controls may be substantially linear within the standard operational range. In this usage, "linear" indicates a control response that is proportional to the control surface deflection. Linear behavior simplifies control algorithms and reduces potential pitfalls. Deep stall for downwind sailing may be stable even though it is an additional mode and beyond the standard operational range Automation can provide useful help in a semi-manual mode in which the operator is actively operating/monitoring the boat. Assistance may include, but is not limited to: heel angle limiting; roll (heel) rate stabilization; pitch rate stabilization; automatic optimization of lift distribution for speed, within heeling angle limitation; boat heading and sailing wing settings to optimize velocity made good; automatic collision warning; automatic collision avoidance via change of course or speed, including stopping; automatic course-follow sailing (along a specified line), for example, at maximum speed within heel angle limits; automatic way-point navigation (sail through a series of points) by, for example, selecting optimum course, or optionally, with integrated weather (wind) forecast (seek favorable wind), including tacking with wind shifts.

The presently disclosed subject matter may also support remote operation. Boat controls can be operated by remotely-operated mechanisms. Boat operational status and data can be provided to a remote operator. Fully-autonomous operation can also be implemented. Autonomous operation adds a layer of operational objectives to the semi-autonomous functions.

Automation and autonomy can be supported by sensors that enable the operator or the operational software to determine the state of the vehicle. Potential sensor outputs are described. "Outputs" contrasts with the actual mechanism of the sensors which are known to those skilled in the art of sensors. These outputs are "raw". Additional outputs can be derived from raw sensor outputs. These derived outputs are not described. Note that each operational case has a laterally symmetric case (mirror image). The term "velocity" combines speed and direction to form a vector.

Hull velocity may be provided in two ways. First, with respect to geographical coordinates (latitude and longitude). Second, with respect to the water in which the boat is sailing. These two velocities may be different due to water currents. Reported in, for example, knots. Angle of Hull Axis to Hull Velocity: This angle may be provided in two ways. First, the angle of the hull axis to the hull velocity with respect to the water. This is also the angle of attack of the keel with respect to the water. Second, the angle of the hull axis with respect to latitude and longitude velocity (due to both current and angle of attack of the keel). Reported in, for example, degrees.

Apparent Wind Velocity: Apparent wind velocity is the sailing wing 100 velocity with respect to the freestream wind. It is the vector sum of the boat's and wind's motion relative to the surface. This is preferably determined at multiple heights above the water's surface. Reported in, for example, knots. Wind speed relative to the surface can be derived from this and hull velocity. Sailing wing Incidence: Sailing wing 100 incidence is the angle of the sailing wing 100 chord line with respect to the hull axis (degrees). Sail Angle of Attack: The angle of the sailing wing with respect to the apparent wind is the angle of attack (degrees). This is preferably determined at multiple heights above the water's surface.

Heel Angle: Heel angle is the angle of the hull about its longitudinal axis (e.g. degrees) with respect to a level (horizontal) plane such as the water surface. Heel Angle Rate of Change: The heel angle rate of change is the angular velocity (e.g. degrees per second) of the hull about its longitudinal axis with respect to a level plane. Pitch Angle: The pitch angle is angle of the hull about a lateral reference axis (e.g. degrees) with respect to a level plane. Pitch Angle Rate of Change: The pitch angle rate of change is the angular velocity (e.g. degrees per second) of the hull about a lateral reference axis with respect to a level plane. Control Surface Deflection(s): Sensors to measure the position of each control surface may benefit control algorithms and identify improper (failing) operation of actuators or control surface mechanisms. Mast Strain: A "strain gauge" is an electronic device that enables measurement of the elongation or compression of a structural element (aka "strain"). It may be beneficial to mount multiple strain gauges on the sailing wing 100 spar structure or, alternatively, the hull spindle mounting structure. Done correctly, in combination with structural characteristics, this can provide data that can be used to compute the net force vectors of the sailing wing 100 on the hull. From this can be derived heeling moment, pitching moment, thrust, side force and downforce. This information may be useful to the operator or the operating algorithms.

Radar: A radar system provides range and heading information about potential obstacles or traffic in the operating environment. The radar antenna may be mounted high within the sailing wing lofted surface. Materials transparent to radio waves may enclose the antenna. Enclosure within the sailing wing protects the antenna from the environment and preserves low aerodynamic drag. Mounting the antenna high within the sailing wing provides greater over-the-horizon view range. Conventional sailboats mount radar antennas external to the sail where it is disruptive to low-drag aerodynamics. The rigid, approximately planar nature of the sailing wing may permit a phased array radar to be used. This may provide improved range or resolution relative to a conventional, smaller, rotating antenna.

Radio Transponder: A radio transponder senses a radio signal "interrogation" and responds with a transmitted signal containing data. This may be mounted high within the sailing wing's loft to provide good range, environmental protection and low drag. Radio Antennas: The sailing wing may be a favorable location for needed radio antennas. These may include communications (in/out) and Global Positioning System (GPS). These may be mounted within the loft of the sailing wing to preserve aerodynamic performance, protect the antennas, and provide a favorable elevated location to enhance horizon-limited range.

Optical Sensors: One or more cameras operating in the visible or infrared spectrum may be mounted high within the sailing wing surface. This may provide a day or night view of the operating environment include geography, ocean surface, weather and traffic. The rigid nature of the sailing wing may permit mounting multiple cameras to provide a stereoscopic view to the operator.

Aerodynamic Sensors: Devices may be integrated with the outer surface of the sailing wing that sense and report local aerodynamic conditions. These may be a simple as "telltale" yarns as used on conventional sails—these must be viewed by the operator. Other devices may provide an electronic signal that can be used by the operator or operating algorithms to adjust the boat's controls. Sensors may sense boundary layer characteristics including pressure, speed, depth and potential flow reversal.

Control System Data: Sensors to provide control system data may be beneficial. Sensors include battery voltage, overall current, charging current, output current and individual actuator currents. Atmospheric Conditions: In addition to wind sensors, other freestream atmospheric sensors may benefit vehicle operations. These include barometric pressure, temperature and humidity. Microphone (Acoustic Sensor): In some cases, the sailing wing and boat may operate quite quietly. In such a case it may be beneficial to include acoustic sensors on the sailing wing at a distance from the water, hull and crew to more clearly detect acoustic signals such as fog horns and engine noise from other vehicles. The rigid and relatively planar nature of the sailing wing surface may permit acoustic sensors to be mounted in an array. This can facilitate signal processing that can focus or sweep the listening region and improve signal to noise ratio.

Based on the foregoing, it should be appreciated that technologies for a sailing wing have been disclosed herein. It is to be understood that the subject matter defined in the appended claims is not necessarily limited to the specific features or acts described herein. Rather, the specific features or acts are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the presently disclosed subject matter, aspects of which are set forth in the following claims.

The invention claimed is:

1. A sailing wing for a vehicle, comprising:
   a main sail extended upwards freely rotatable about a pivot axis;
   a control surface rotatable affixed to a rear portion of the main sail, the control surface rotatable about a hinge to cause a deflection of the main sail about the pivot axis;
   a second control surface rotatably affixed to the rear portion of the main sail, the second control surface rotatable about a second hinge to modify the deflection of the main sail caused by the control surface;
   a controller to modify a position of the control surface; and
   a second controller to modify a position of the second control surface, wherein the position of the control surface and the position of the second control surface are individually controllable with respect to each other.

2. The sailing wing of claim 1, wherein the main sail comprises a first segment proximate to a second segment, wherein the first segment and the second segment are individually rotatable about the pivot axis running through the sailing wing.

3. The sailing wing of claim 2, wherein the first segment comprises the first control surface and the second control surface and the second segment comprises a third control surface and a fourth control surface.

4. The sailing wing of claim 1, wherein an aerodynamic center of the main sail is located aft of the pivot axis.

5. The sailing wing of claim 4, wherein a quarter chord of the mean aerodynamic chord of the main sail is located approximately one percent to seven percent of a mean aerodynamic chord length aft of the pivot axis.

6. The sailing wing of claim 1, wherein the sailing wing is statically mass-balanced about the pivot axis.

7. The sailing wing of claim 1, wherein the sailing wing is dynamically mass-balanced about the pivot axis with respect to heel and pitch rotation.

8. The sailing wing of claim 1, further comprising a leading edge control surface separately rotatable from the main sail and rotatable around a leading edge hinge.

9. The sailing wing of claim 8, wherein the leading edge control surface is individually controllable in relation to the control surface.

10. The sailing wing of claim 1, wherein the pivot axis and the sailing wing are swept aft.

11. The sailing wing of claim 1, wherein the sailing wing is swept aft and the pivot axis is vertical from the vehicle.

12. The sailing wing of claim 1, wherein a part of the sailing wing is swept aft and a part of the sailing wing is unswept, and wherein the pivot axis is vertical from the vehicle.

13. The sailing wing of claim 1, wherein the sailing wing and the pivot axis are swept forward.

14. The sailing wing of claim 1, wherein the sailing wing is a crescent shape, where at least an upper portion and a lower portion of the sailing wing is swept aft and a middle portion is unswept, and wherein the pivot axis is vertical from the vehicle.

15. The sailing wing of claim 1, wherein the main sail is cantable around an axis that runs through the vehicle.

16. The sailing wing of claim 15, wherein the main sail is cantable up to 90 degrees for an upright position or parallel to a water plane.

17. The sailing wing of claim 15, further comprising a second sail that is cantable about the axis that runs through the vehicle.

18. A method of operating a sailboat to adjust for wind angle, comprising the steps of:
providing:
a main sail extended upwards freely rotatable about a pivot axis;
a first control surface rotatably affixed to a rear portion of the main sail, the first control surface rotatable about a hinge to cause a deflection of the main sail about the pivot axis;
a second control surface affixed to a rear portion of the main sail, the second control surface rotatable about a second hinge to modify the deflection of the main sail caused by the control surface; and
and a controller to individually modify a position of the first control surface and a position of the second control surface; and
individually deflecting the first control surface and second control surface to increase or decrease a thrust of the sailboat.

* * * * *